United States Patent
Negishi et al.

(10) Patent No.: US 10,654,990 B2
(45) Date of Patent: May 19, 2020

(54) THERMAL STABILIZER COMPOSITION AND SYNTHETIC RESIN COMPOSITION COMPRISING SAME

(71) Applicant: ADEKA CORPORATION, Tokyo (JP)

(72) Inventors: Yoshinori Negishi, Saitama (JP); Yasuhiro Honma, Saitama (JP); Masaki Segawa, Saitama (JP); Yuto Ishizuka, Saitama (JP); Mariko Ishii, Saitama (JP)

(73) Assignee: ADEKA CORPORATION, Tokyo (JP)

( * ) Notice: Subject to any disclaimer, the term of this patent is extended or adjusted under 35 U.S.C. 154(b) by 0 days.

(21) Appl. No.: 15/506,384

(22) PCT Filed: Aug. 4, 2015

(86) PCT No.: PCT/JP2015/072149
§ 371 (c)(1),
(2) Date: Feb. 24, 2017

(87) PCT Pub. No.: WO2016/031505
PCT Pub. Date: Mar. 3, 2016

(65) Prior Publication Data
US 2017/0253727 A1 Sep. 7, 2017

(30) Foreign Application Priority Data
Aug. 27, 2014 (JP) .................... 2014-173319

(51) Int. Cl.
| | | |
|---|---|---|
| *C08K 5/524* | (2006.01) | |
| *C09K 15/08* | (2006.01) | |
| *C08K 5/13* | (2006.01) | |
| *C08L 101/00* | (2006.01) | |
| *C09K 15/32* | (2006.01) | |
| *C08K 5/00* | (2006.01) | |
| *C08K 5/134* | (2006.01) | |
| *C08K 5/527* | (2006.01) | |
| *C09K 15/06* | (2006.01) | |

(52) U.S. Cl.
CPC .............. *C08K 5/524* (2013.01); *C08K 5/005* (2013.01); *C08K 5/13* (2013.01); *C08K 5/134* (2013.01); *C08K 5/527* (2013.01); *C08L 101/00* (2013.01); *C09K 15/06* (2013.01); *C09K 15/08* (2013.01); *C09K 15/322* (2013.01)

(58) Field of Classification Search
CPC .......... C08K 5/524; C08K 5/13; C09K 15/06; C09K 15/08
See application file for complete search history.

(56) References Cited

U.S. PATENT DOCUMENTS

| | | | | | |
|---|---|---|---|---|---|
| 3,409,587 | A | * | 11/1968 | Mills ................. | C08K 5/00 252/404 |
| 3,950,305 | A | * | 4/1976 | Schmidt ............. | C08K 5/13 428/437 |
| 4,394,472 | A | * | 7/1983 | Ito .................... | C08K 5/3492 524/100 |
| 2002/0040081 | A1 | * | 4/2002 | Stein ................. | C08K 5/1345 524/121 |
| 2005/0288403 | A1 | * | 12/2005 | de la Cruz ......... | C08K 5/13 524/99 |
| 2007/0254992 | A1 | | 11/2007 | Callierotti et al. | |
| 2009/0088513 | A1 | * | 4/2009 | Yukino .............. | C08K 3/34 524/450 |

(Continued)

FOREIGN PATENT DOCUMENTS

| | | |
|---|---|---|
| CN | 1302058 C | 2/2007 |
| CN | 102844381 A | 12/2012 |
| EP | 0 238 140 A2 | 9/1987 |

(Continued)

OTHER PUBLICATIONS

International Search Report issued in PCT/JP2015/072149, dated Nov. 2, 2015.
Written Opinion of the International Searching Authority issued in PCT/JP2015/072149, dated Nov. 2, 2015.
Extended European Search Report, dated Feb. 27, 2018, for European Application No. 15836809.2.
Taiwanese Office Action and Search Report for Taiwanese Application No. 104127184, dated Jan. 30, 2019.

*Primary Examiner* — Robert C Boyle
(74) *Attorney, Agent, or Firm* — Birch, Stewart, Kolasch & Birch, LLP

(57) ABSTRACT

Provided are: a thermal stabilizer composition which does not generate an odor of a phosphorus-based antioxidant; and a synthetic resin composition comprising the same. The thermal stabilizer composition comprises: 100 parts by mass of a phosphorus-based antioxidant having a phosphite structure; and 0.001 to 10 parts by mass of a phenolic antioxidant having a substructure represented by the following Formula (1):

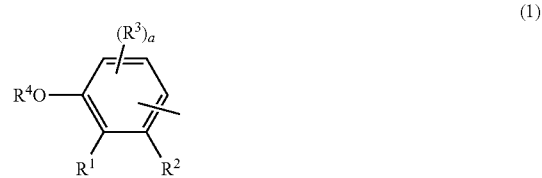

(1)

(wherein, $R^1$, $R^2$, $R^3$ and $R^4$ each independently represent a hydrogen atom or a hydrocarbon group having 1 to 10 carbon atoms; a represents an integer of 0 to 2; and, when a is 2, plural $R^3$s are optionally the same or different).

6 Claims, No Drawings

(56) References Cited

U.S. PATENT DOCUMENTS

2013/0035426 A1   2/2013   Kimura et al.

FOREIGN PATENT DOCUMENTS

| EP | 0827979 A1 | 3/1998 |
| EP | 0 875 533 A2 | 11/1998 |
| EP | 2392616 A1 | 12/2011 |
| JP | 62-141117 A | 6/1987 |
| JP | 62-218437 A | 9/1987 |
| JP | 6-212185 A | 8/1994 |
| JP | 10-306175 A | 11/1998 |
| JP | 10-330567 A | 12/1998 |
| JP | 11-49890 A | 2/1999 |
| JP | 2001-316549 A | 11/2001 |
| JP | 2011-195623 A | 10/2011 |

\* cited by examiner

THERMAL STABILIZER COMPOSITION AND SYNTHETIC RESIN COMPOSITION COMPRISING SAME

TECHNICAL FIELD

The present invention relates to a thermal stabilizer composition and a synthetic resin composition comprising the same. More particularly, the present invention relates to: a thermal stabilizer composition which does not generate an odor of a phosphorus-based antioxidant; and a synthetic resin composition comprising the same.

BACKGROUND ART

It is known that organic materials such as thermoplastic resins, thermosetting resins, crystalline resins, amorphous resins, biodegradable resins, non-biodegradable resins, engineering resins, polymer alloys, natural and synthetic rubbers, lubricating oils, adhesives and paints undergo molecular cleavage and/or molecular cross-linking when subjected to the effect of heat, oxygen, light and the like and this is accompanied by reduction in the strength and physical properties of the organic materials as well as deterioration of the outer appearance due to coloration and the like, so that their commercial values are markedly impaired. In order to solve this problem, organic materials are stabilized by using them in combination with a variety of stabilizers, such as phenolic antioxidants, phosphorus-based antioxidants, thioether-based antioxidants, lactone-based stabilizers, hydroxylamine-based antioxidants, vitamin E-based antioxidants, hindered amine-based stabilizers and ultraviolet absorbers.

Among these stabilizers, phosphorus-based antioxidants are widely used because they not only show excellent deterioration-inhibiting effect particularly during processing and are capable of exerting a synergistic effect with other stabilizers but also can be applied to almost any resin that is used as a plastic material. As phosphorus-based antioxidants, compounds of various structures are utilized; however, there are cases where a unique phosphite odor is generated with time when such compounds are exposed to a high temperature or stored over a long period. An addition of an odor-generating phosphorus-based antioxidant to a resin may result in the generation of an unpleasant odor during molding of the resin and/or the generation of an odor in the resulting molded article.

There have been made a number of reports on investigation relating to improvement in the odor of molded articles and, for example, Patent Document 1 proposes the use of a phosphite compound having a melting point of higher than 40° C. in a fatty acid cellulose ester-based resin composition. In Patent Document 2, it is proposed to incorporate a phenolic antioxidant and a phosphite compound for the purpose of improving the odor of an epoxidized vegetable oil composition. Further, in Patent Document 3, it is proposed to incorporate an organic carboxylic acid zinc salt and an alkyl phosphite compound for the purpose of improving the odor that is generated when an epoxidized vegetable oil is added to a vinyl chloride resin composition.

Moreover, in Patent Document 4, for the purpose of improving the odor that is generated when water is allowed to pass through a hose made of a vinyl chloride-based resin, it is proposed to incorporate a phosphorus-based antioxidant, such as trisnonylphenyl phosphite or tris(2,4-di-tert-butylphenyephosphite, into a vinyl chloride-based resin composition. Furthermore, in Patent Document 5, for the purpose of improving the odor of a metallocene-based polyethylene, it is proposed to incorporate a phenolic antioxidant and a phosphorus-based stabilizer, such as tris(2,4-di-tert-butylphenyl)phosphite or (2,6-di-tert-butyl-4-methylphenyl)pentaerythritol diphosphite, into a resin composition.

RELATED ART DOCUMENTS

Patent Documents

Patent Document 1: Japanese Unexamined Patent Application Publication No. H10-306175
Patent Document 2: Japanese Unexamined Patent Application Publication No. H6-212185
Patent Document 3: Japanese Unexamined Patent Application Publication No. 2001-316549
Patent Document 4: Japanese Unexamined Patent Application Publication No. H10-330567
Patent Document 5: Japanese Unexamined Patent Application Publication No. H11-49890

SUMMARY OF THE INVENTION

Problems to be Solved by the Invention

However, in these Patent Documents 1 to 5, although methods of improving the odor of a molded article (product) are proposed, the phosphite order of a phosphorus-based antioxidant itself is not examined at all. Further, it is known to use an adsorbent for removal of phosphite odor; however, it is difficult to suppress the generation of phosphite odor. In this manner, an improvement in the odor of a phosphorus-based antioxidant has not been concretely examined until now.

In view of the above, an object of the present invention is to provide: a thermal stabilizer composition which does not generate an odor of a phosphorus-based antioxidant; and a synthetic resin composition comprising the same.

Means for Solving the Problems

The present inventors intensively studied to solve the above-described problems and discovered that the problems can be solved by using a combination of a phosphorus-based antioxidant having a phosphite structure and a phenolic antioxidant having a prescribed structure at a prescribed ratio, thereby completing the present invention.

That is, the thermal stabilizer composition of the present invention comprises: 100 parts by mass of a phosphorus-based antioxidant having a phosphite structure; and 0.001 to 10 parts by mass of a phenolic antioxidant having a substructure represented by the following Formula (1):

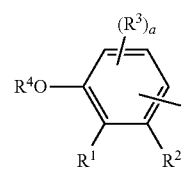

(wherein, $R^1$, $R^2$, $R^3$ and $R^4$ each independently represent a hydrogen atom or a hydrocarbon group having 1 to 10 carbon atoms; a represents an integer of 0 to 2; and, when a is 2, plural $R^3$s are optionally the same or different).

In the thermal stabilizer composition of the present invention, the phenolic antioxidant is preferably a compound represented by the following Formula (2):

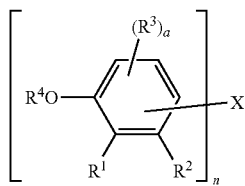

(2)

(wherein, $R^1$, $R^2$ and $R^3$ each independently represent a hydrogen atom or a hydrocarbon group having 1 to 10 carbon atoms; a represents an integer of 0 to 2; when a is 2, plural $R^3$s are optionally the same or different; n represents an integer of 1 to 4;

when n is 1, X represents an alkyl group having 1 to 40 carbon atoms, an alkoxy group having 1 to 40 carbon atoms, an aryl group having 6 to 40 carbon atoms, an arylalkyl group having 7 to 40 carbon atoms or a combination thereof, and $R^4$ represents a hydrogen atom;

when n is 2, X represents an alkylidene group having 1 to 40 carbon atoms, an arylene group having 6 to 40 carbon atoms or a group represented by the following Formula (3):

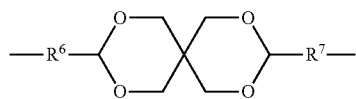

(3)

(wherein, $R^6$ and $R^7$ each independently represent an alkylidene group having 1 to 40 carbon atoms or an arylene group having 6 to 40 carbon atoms), and $R^4$ represents a hydrogen atom or a hydrocarbon group having 1 to 10 carbon atoms, with a proviso that at least one $R^4$ represents a hydrogen atom;

when n is 3, X represents an alkanetriyl group having 1 to 40 carbon atoms or a trivalent cyclic group having 6 to 40 carbon atoms, and $R^4$ represents a hydrogen atom or a hydrocarbon group having 1 to 10 carbon atoms, with a proviso that at least one $R^4$ represents a hydrogen atom;

when n is 4, X represents an alkanetetrayl group having 1 to 40 carbon atoms, and $R^4$ represents a hydrogen atom or a hydrocarbon group having 1 to 10 carbon atoms, with a proviso that at least one $R^4$ represents a hydrogen atom; and a methylene group in the alkyl group, alkoxy group, arylalkyl group, alkylidene group, alkanetriyl group and alkanetetrayl group is optionally substituted with >C=O, —O—, —S—, —CO—O—, —O—CO—, —O—CO—O—, —$NR^5$—, a phosphine, a phosphinite, a phosphonite, a phosphite, a phosphorane, a phosphonate or a combination thereof and optionally branched, and $R^5$ represents a hydrogen atom or an alkyl group having 1 to 4 carbon atoms).

In the thermal stabilizer composition of the present invention, it is preferred that the phosphorus-based antioxidant comprises at least one compound represented by any of the following Formulae (4) to (8):

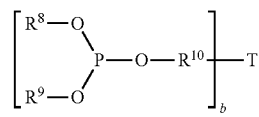

(4)

(wherein, $R^8$ and $R^9$ each independently represent an alkyl group having 1 to 40 carbon atoms, an aryl group having 6 to 40 carbon atoms, an arylalkyl group having 7 to 40 carbon atoms, a heterocycle-containing group having 3 to 25 carbon atoms or a combination thereof; $R^8$ and $R^9$ are optionally bound together to form a cyclic group; $R^{10}$ represents a direct bond, an alkylidene group having 1 to 40 carbon atoms or an arylene group having 6 to 40 carbon atoms; b represents an integer of 1 to 3; when b is 1, T represents a hydrogen atom, an alkyl group having 1 to 40 carbon atoms, an aryl group having 6 to 40 carbon atoms or a heterocycle-containing group having 3 to 25 carbon atoms; when b is 2, T represents an alkylidene group having 1 to 40 carbon atoms, an arylene group having 6 to 40 carbon atoms, —S— or a group represented by the following Formula (3):

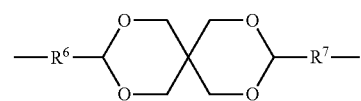

(3)

(wherein, $R^6$ and $R^7$ each independently represent an alkylidene group having 1 to 40 carbon atoms or an arylene group having 6 to 40 carbon atoms); and when b is 3, T represents an alkanetriyl group having 1 to 40 carbon atoms);

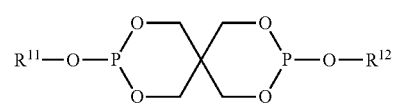

(5)

(wherein, $R^{11}$ and $R^{12}$ each independently represent an alkyl group having 1 to 40 carbon atoms or an aryl group having 6 to 40 carbon atoms);

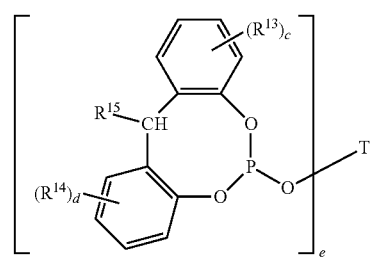

(6)

(wherein, $R^{13}$ and $R^{14}$ each independently represent a hydrogen atom or an alkyl group having 1 to 10 carbon atoms; $R^{15}$ represents a hydrogen atom or an alkyl group having 1 to 4 carbon atoms; T represents the same as the T in the Formula (4); c represents an integer of 0 to 4; d represents an integer of 0 to 4; e represents an integer of 1 to 3; when c is 2 or larger, plural $R^{13}$s are optionally the same or different; when d is 2 or larger, plural $R^{14}$s are optionally the same or different; when e is 1, T represents a hydrogen atom, an alkyl group having 1 to 40 carbon atoms, an aryl group having 6 to 40 carbon atoms or a heterocycle-containing group having 3 to 25 carbon atoms; when e is 2, T represents an alkylidene group having 1 to 40 carbon atoms, an arylene group having 6 to 40 carbon atoms, —S— or a group represented by the Formula (3); and when e is 3, T represents an alkanetriyl group having 1 to 40 carbon atoms);

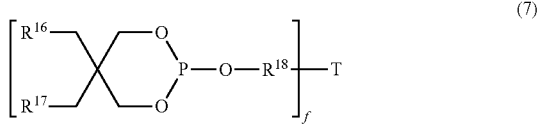

(7)

(wherein, $R^{16}$ and $R^{17}$ each independently represent an alkyl group having 1 to 40 carbon atoms, an alkoxy group having 1 to 40 carbon atoms, an aryl group having 6 to 40 carbon atoms, an arylalkyl group having 7 to 40 carbon atoms or a heterocycle-containing group having 3 to 25 carbon atoms; $R^{18}$ represents an alkylidene group having 1 to 40 carbon atoms or an arylene group having 6 to 40 carbon atoms; f represents an integer of 1 to 3; when f is 1, T represents a hydrogen atom, an alkyl group having 1 to 40 carbon atoms, an aryl group having 6 to 40 carbon atoms or a heterocycle-containing group having 3 to 25 carbon atoms; when f is 2, T represents an alkylidene group having 1 to 40 carbon atoms, an arylene group having 6 to 40 carbon atoms, —S— or a group represented by the Formula (3); and when f is 3, T represents an alkanetriyl group having 1 to 40 carbon atoms); and

(8)

(wherein, $R^{19}$, $R^{20}$ and $R^{21}$ each independently represent a hydrogen atom, an alkyl group having 1 to 40 carbon atoms, an aryl group having 6 to 40 carbon atoms, an arylalkyl group having 7 to 40 carbon atoms or a heterocycle-containing group having 3 to 25 carbon atoms, with a proviso that $R^{19}$, $R^{20}$ and $R^{21}$ are not hydrogen atoms at the same time).

In the thermal stabilizer composition of the present invention, it is also preferred that the phosphorus-based antioxidant having a phosphite structure has a melting point of 100° C. or lower. Further, in the thermal stabilizer composition of the present invention, it is preferred that, in the Formula (1), $R^1$ is a tert-butyl group, $R^2$ is a hydrogen atom and $R^3$ is a methyl group. Still further, in the thermal stabilizer composition of the present invention, it is preferred that, in the Formula (2), $R^1$ is a tert-butyl group, $R^2$ is a hydrogen atom, and $R^3$ is a methyl group. Moreover, in the thermal stabilizer composition of the present invention, it is preferred that the phenolic antioxidant has a molecular weight in a range of 300 to 2,000.

The synthetic resin composition of the present invention comprises 0.001 to 10 parts by mass of the thermal stabilizer composition of the present invention with respect to 100 parts by mass of a synthetic resin.

Effects of the Invention

According to the present invention, a thermal stabilizer composition which does not generate an odor of a phosphorus-based antioxidant as well as a synthetic resin composition comprising the same can be provided.

MODE FOR CARRYING OUT THE INVENTION

The thermal stabilizer composition of the present invention will now be described based on preferred embodiments.

The thermal stabilizer composition of the present invention comprises: 100 parts by mass of a phosphorus-based antioxidant having a phosphite structure; and 0.001 to 10 parts by mass of a phenolic antioxidant having a substructure represented by the following Formula (1). In the Formula (1), $R^1$, $R^2$, $R^3$ and $R^4$ each independently represent a hydrogen atom or a hydrocarbon group having 1 to 10 carbon atoms; a represents an integer of 0 to 2; and, when a is 2, plural $R^3$s are optionally the same or different.

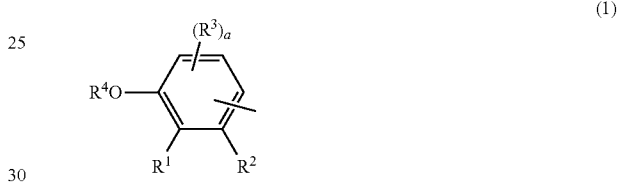

(1)

First, the phenolic antioxidant according to the thermal stabilizer composition of the present invention will be described.

In the phenolic antioxidant represented by the Formula (1), the hydrocarbon group having 1 to 10 carbon atoms that may be represented by $R^1$, $R^2$, $R^3$ and $R^4$ refers to a functional group constituted by a carbon atom(s) and hydrogen atoms, and examples of its molecular structure include those of alkanes, alkenes, cycloalkanes and aromatic hydrocarbons. These hydrocarbon groups are optionally interrupted by an oxygen atom, a sulfur atom, a carbonyl group, an ester group, an amide group, an imino group or an aryl group, and the hydrogen atoms of the hydrocarbon groups are also optionally substituted with any of the below-described substituents. Such interruptions or substitutions may exist in combination as well.

Examples of a substituent substituting a hydrogen atom of the hydrocarbon group include a hydroxy group, a halogen atom, an amino group, a nitro group, a cyano group, chain aliphatic groups (e.g., alkenyl groups, alkenyloxy groups, alkanoyloxy groups and alkoxycarbonyl groups), pyrrole, furan, thiophene, imidazole, pyridine, pyridazine, pyrimidine, pyrazine, piperidine, morpholine, 2H-pyran, 4H-pyran, phenyl, biphenyl, triphenyl, naphthalene, anthracene, pyrrolidine, pyrindine, indoline, indole, isoindole, indazole, purine, quinolizine, quinoline, isoquinoline, and cyclic aliphatic groups such as cycloalkyl groups.

In the present invention, $R^1$, $R^2$ and $R^3$ are each preferably an alkyl group or a phenyl group, more preferably a group selected from the group consisting of methyl, butyl, tert-butyl, pentyl, tert-pentyl, cycloalkyl, methylcycloalkyl and 2-phenyl-propan-2-yl. A compound wherein $R^1$ and $R^2$ are not simultaneously hydrogen atoms is particularly preferred because such a compound can impart excellent heat resistance to organic materials. It is preferred that $R^4$ be a hydrogen atom.

In the present invention, the phenolic antioxidant is preferably a compound represented by the following Formula (2):

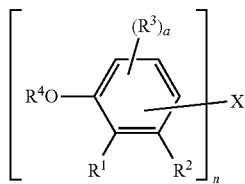

(2)

In the Formula (2), $R^1$, $R^2$, $R^3$ and $R^4$ each represent the same hydrogen atom or hydrocarbon group having 1 to 10 carbon atoms as the $R^1$, $R^2$, $R^3$ and $R^4$ of the Formula (1). However, at least one $R^4$ is a hydrogen atom. In the Formula (2), "a" represents an integer of 0 to 2 and, when a is 2, plural $R^3$s are optionally the same or different. Further, "n" represents an integer of 1 to 4.

When n is 1, X represents any of an alkyl group having 1 to 40 carbon atoms, an alkoxy group having 1 to 40 carbon atoms, an aryl group having 6 to 40 carbon atoms, an arylalkyl group having 7 to 40 carbon atoms and a combination thereof, and $R^4$ represents a hydrogen atom.

When n is 2, X represents any of an alkylidene group having 1 to 40 carbon atoms, an arylene group having 6 to 40 carbon atoms and a group represented by the below-described Formula (3), and $R^4$ represents a hydrogen atom or a hydrocarbon group having 1 to 10 carbon atoms, with a proviso that at least one $R^4$ represents a hydrogen atom.

The group represented by the Formula (3) has the following structure. In the Formula (3), $R^6$ and $R^7$ each independently represent an alkylidene group having 1 to 40 carbon atoms or an arylene group having 6 to 40 carbon atoms.

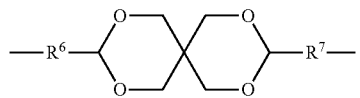

(3)

When n is 3, X represents an alkanetriyl group having 1 to 40 carbon atoms or a trivalent cyclic group having 6 to 40 carbon atoms, and $R^4$ represents a hydrogen atom or a hydrocarbon group having 1 to 10 carbon atoms, with a proviso that at least one $R^4$ represents a hydrogen atom.

When n is 4, X represents an alkanetetrayl group having 1 to 40 carbon atoms, and $R^4$ represents a hydrogen atom or a hydrocarbon group having 1 to 10 carbon atoms, with a proviso that at least one $R^4$ represents a hydrogen atom.

Methylene groups in the alkyl group, alkoxy group, arylalkyl group, alkylidene group, alkanetriyl group and alkanetetrayl group represented by X in the Formula (2) are optionally substituted with >C=O, —O—, —S—, —CO—O—, —O—CO—, —O—CO—O—, —$NR^5$—, a phosphine, a phosphinite, a phosphonite, a phosphite, a phosphorane, a phosphonate or a combination thereof and these groups are optionally branched. Here, $R^5$ represents a hydrogen atom or an alkyl group having 1 to 4 carbon atoms.

Examples of the alkyl group having 1 to 40 carbon atoms that may be represented by X in the Formula (2) include methyl, ethyl, propyl, iso-propyl, cyclopropyl, butyl, sec-butyl, tert-butyl, iso-butyl, pentyl, iso-pentyl, tert-pentyl, cyclopentyl, 4-ethyl-2-methylheptyl, hexyl, 2-methylhexyl, 3-methylhexyl, cyclohexyl, 4-methylcyclohexyl, 2,4-dimethylhexyl, cyclohexyl, 1,2,4-trimethylcyclohexyl, heptyl, 2-heptyl, 3-heptyl, iso-heptyl, tert-heptyl, 1-octyl, iso-octyl, tert-octyl, nonyl, isononyl, decyl, undecyl, dodecyl, tridecyl, isotridecyl, tetradecyl, pentadecyl, hexadecyl, heptadecyl, octadecyl, icosyl, adamantyl and norbornyl.

Examples of the alkoxy group having 1 to 40 carbon atoms that may be represented by X in the Formula (2) include methyloxy, ethyloxy, iso-propyloxy, butyloxy, sec-butyloxy, tert-butyloxy, iso-butyloxy, pentyloxy, iso-pentyloxy, tert-pentyloxy, hexyloxy, 2-hexyloxy, 3-hexyloxy, cyclohexyloxy, 4-methylcyclohexyloxy, heptyloxy, 2-heptyloxy, 3-heptyloxy, iso-heptyloxy, tert-heptyloxy, 1-octyloxy, iso-octyloxy and tert-octyloxy.

Examples of the aryl group having 6 to 40 carbon atoms that may be represented by X in the Formula (2) include phenyl, naphthyl, anthracenyl, phenanthryl, fluorenyl, indenyl, 2-methylphenyl, 3-methylphenyl, 4-methylphenyl, 4-vinylphenyl, 3-iso-propylphenyl, 4-iso-propylphenyl, 4-butylphenyl, 4-iso-butylphenyl, 4-tert-butyl-phenyl, 4-hexylphenyl, 4-cyclohexylphenyl, 4-octylphenyl, 4-(2-ethylhexyl)phenyl, 4-stearylphenyl, 2,3-dimethylphenyl, 2,4-dimethylphenyl, 2,5-dimethylphenyl, 2,6-dimethylphenyl, 3,4-dimethylphenyl, 3,5-dimethylphenyl, 2,4-di-tert-butylphenyl, 2,5-di-tert-butylphenyl, 2,6-di-tert-butylphenyl, 2,4-di-tert-pentylphenyl, 2,5-di-tert-amylphenyl, 2,5-di-tert-octylphenyl, 2,4-dicumylphenyl, 4-cyclohexylphenyl, (1,1'-biphenyl)-4-yl, 2,4,5-trimethylphenyl and ferrocenyl.

Examples of the arylalkyl group having 7 to 40 carbon atoms that may be represented by X in the Formula (2) include benzyl, 1-methyl-1-phenylethyl, 2-phenyl-propan-2-yl, 1-naphthylmethyl, 9-anthracenylmethyl, fluorenyl, indenyl, 9-fluorenylmethyl, 2-phenylpropan-2-yl, diphenylmethyl, triphenylmethyl, phenethyl, styryl and cinnamyl Examples of the alkylidene group having 1 to 40 carbon atoms that may be represented by X in the Formula (2) include the above-exemplified alkyl groups having 1 to 40 carbon atoms from which one hydrogen atom is withdrawn.

Examples of the arylene group having 6 to 40 carbon atoms that may be represented by X in the Formula (2) include the above-exemplified aryl groups having 6 to 40 carbon atoms from which one aromatic hydrogen atom is withdrawn.

Examples of the alkanetriyl group having 1 to 40 carbon atoms that may be represented by X in the Formula (2) include the above-exemplified alkyl groups from which two hydrogen atoms are withdrawn.

Examples of the trivalent cyclic group having 6 to 40 carbon atoms that may be represented by X in the Formula (2) include the above-exemplified aryl groups having 6 to 40 carbon atoms from which two aromatic hydrogen atoms are withdrawn, isocyanurate ring-containing groups, and triazine ring-containing groups.

Examples of the alkanetetrayl group having 1 to 40 carbon atoms that may be represented by X in the Formula (2) include the above-exemplified alkyl groups having 1 to 40 carbon atoms from which three hydrogen atoms are withdrawn.

Examples of the hydrocarbon group having 1 to 10 carbon atoms that may be represented by $R^1$, $R^2$, $R^3$ and $R^4$ in the Formula (2) include the same ones as those exemplified above for the hydrocarbon group having 1 to 10 carbon atoms in the Formula (1).

In the present invention, a hydrogen atom of a methylene group in these alkyl groups, alkoxy groups, arylalkyl groups, alkylidene groups, alkanetriyl groups and alkanetetrayl groups is optionally substituted with a substituent.

Examples of the substituent include ethylenically unsaturated groups such as vinyl, allyl, acryl and methacryl; halogen atoms such as fluorine, chlorine, bromine and iodine; acyl groups such as acetyl, 2-chloroacetyl, propionyl, octanoyl, acryloyl, methacryloyl, phenylcarbonyl(benzoyl), phthaloyl, 4-trifluoromethylbenzoyl, pivaloyl, salicyloyl, oxaloyl, stearoyl, methoxycarbonyl, ethoxycarbonyl, tert-butoxycarbonyl, n-octadecyloxycarbonyl and carbamoyl; acyloxy groups such as acetyloxy and benzoyloxy; an amino group; substituted amino groups such as ethylamino, dimethylamino, diethylamino, butylamino, cyclopentylamino, 2-ethylhexylamino, dodecylamino, anilino, chlorophenylamino, toluidino, anisidino, N-methyl-anilino, diphenylamino, naphthylamino, 2-pyridylamino, methoxycarbonylamino, phenoxycarbonylamino, acetylamino, benzoylamino, formylamino, pivaloylamino, lauroylamino, carbamoylamino, N,N-dimethylaminocarbonylamino, N,N-diethylaminocarbonylamino, morpholinocarbonylamino, methoxycarbonylamino, ethoxycarbonylamino, tert-butoxycarbonylamino, n-octadecyloxycarbonylamino, N-methyl-methoxycarbonylamino, phenoxycarbonylamino, sulfamoylamino, N,N-dimethylaminosulfonylamino, methylsulfonylamino, butylsulfonylamino and phenylsulfonylamino; a sulfonamide group; a sulfonyl group; a carboxyl group; a cyano group; a sulfo group; a hydroxyl group; a nitro group; a mercapto group; an imide group; a carbamoyl group; a sulfonamide group; a phosphonate group; a phosphate group; and salts of a carboxyl group, a sulfo group, a phosphonate group and a phosphate group. In the present invention, unless otherwise specified, each substituent may further contain the above described substituent.

In the thermal stabilizer composition of the present invention, a hydrogen atom in these aryl, arylalkylene, arylene and trivalent cyclic groups is optionally substituted with a substituent.

Examples of the substituent include ethylenically unsaturated groups such as vinyl, allyl, acryl and methacryl; halogen atoms such as fluorine, chlorine, bromine and iodine; acyl groups such as acetyl, 2-chloroacetyl, propionyl, octanoyl, acryloyl, methacryloyl, phenylcarbonyl(benzoyl), phthaloyl, 4-trifluoromethylbenzoyl, pivaloyl, salicyloyl, oxaloyl, stearoyl, methoxycarbonyl, ethoxycarbonyl, tert-butoxycarbonyl, n-octadecyloxycarbonyl and carbamoyl; acyloxy groups such as acetyloxy and benzoyloxy; an amino group; substituted amino groups such as ethylamino, dimethylamino, diethylamino, butylamino, cyclopentylamino, 2-ethylhexylamino, dodecylamino, anilino, chlorophenylamino, toluidino, anisidino, N-methyl-anilino, diphenylamino, naphthylamino, 2-pyridylamino, methoxycarbonylamino, phenoxycarbonylamino, acetylamino, benzoylamino, formylamino, pivaloylamino, lauroylamino, carbamoylamino, N,N-dimethylaminocarbonylamino, N,N-diethylaminocarbonylamino, morpholinocarbonylamino, methoxycarbonylamino, ethoxycarbonylamino, tert-butoxycarbonylamino, n-octadecyloxycarbonylamino, N-methyl-methoxycarbonylamino, phenoxycarbonylamino, sulfamoylamino, N,N-dimethylaminosulfonylamino, methylsulfonylamino, butylsulfonylamino and phenylsulfonylamino; a sulfonamide group; a sulfonyl group; a carboxyl group; a cyano group; a sulfo group; a hydroxyl group; a nitro group; a mercapto group; an imide group; a carbamoyl group; a sulfonamide group; a phosphonate group; phosphorus compounds such as phosphines, phosphinites, phosphonites, phosphites, phosphoranes and phosphonates; and salts of a carboxyl group, a sulfo group, a phosphonate group and phosphorus compounds such as phosphines, phosphinites, phosphonites, phosphites, phosphoranes and phosphonates. These groups may further contain a substituent.

The phenolic antioxidant according to the thermal stabilizer composition of the present invention also encompasses those compounds represented by the Formula (2) wherein X comprises a group represented by the following Formula (3). In the Formula (3), $R^6$ and $R^7$ each represent an alkylidene group having 1 to 40 carbon atoms or an arylene group having 6 to 40 carbon atoms, and these groups are each the same as the alkylidene groups having 1 to 40 carbon atoms and arylene groups having 6 to 40 carbon atoms that are exemplified above for X in the Formula (2).

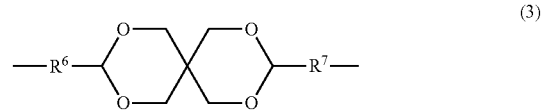

(3)

In the thermal stabilizer composition of the present invention, specific examples of a compound used as the phenolic antioxidant having a substructure represented by the Formula (1) include the following compounds. However, the present invention is not restricted to the following compounds.

Specific examples of a compound used as the phenolic antioxidant having a substructure represented by the Formula (1) include 2,6-di-tert-butyl-4-methylphenol, 2,6-di-tert-butyl-4-ethylphenol, 2-tert-butyl-4,6-dimethylphenol, styrenated phenol, 2,2'-methylenebis(4-ethyl-6-tert-butylphenol), 2,2'-thiobis-(6-tert-butyl-4-methylphenol), 2,2'-methylenebis(6-tert-butyl-4-ethylphenol), 2,2'-methylenebis(4,6-di-tert-butylphenol), 2,2'-ethylidenebis(4-sec-butyl-6-tert-butylphenol), 2,6-di-tert-butyl-4-sec-butylphenol, 2,2'-thiodiethylenebis[3-(3,5-di-tert-butyl-4-hydroxyphenyepropionate], 2-methyl-4,6-bis(octylsulfanylmethyl)phenol, 2,2'-isobutylidenebis(4,6-dimethylphenol), isooctyl-3-(3,5-di-tert-butyl-4-hydroxyphenyl)propionate, N,N'-hexane-1,6-diylbis[3-(3,5-di-tert-butyl-4-hydroxyphenyl)propionamide, 2,2'-oxamidebis[ethyl-3-(3,5-di-tert-butyl-4-hydroxyphenyl)propionate], 2-ethylhexyl-3-(3',5'-di-tert-butyl-4'-hydroxyphenyl)propionate, 2,2'-ethylenebis(4,6-di-tert-butylphenol), esters of 3,5-bis(1,1-dimethylethyl)-4-hydroxy-benzenepropanoic acid and a C13-15 alkyl, 2,5-di-tert-amylhydroquinone, hindered phenol polymer (AO.OH998 (trade name), manufactured by ADEKA Palmarole), 2,2'-methylenebis[6-(1-methylcyclohexyl)-p-cresol], 2-tert-butyl-6-(3-tert-butyl-2-hydroxy-5-methylbenzyl)-4-methylphenyl acrylate, 2-[1-(2-hydroxy-3,5-di-tert-pentylphenyl)ethyl]-4,6-di-tert-pentylphenyl acrylate, 6-[3-(3-tert-butyl-4-hydroxy-5-methyl)propoxy]-2,4,8,10-tetra-tert-butylbenzo[d,f][1,3,2]-dioxaphosphepin, hexamethylene-bis[3-(3,5-di-tert-butyl-4-hydroxyphenyl)propionate, calcium bis[monoethyl(3,5-di-tert-butyl-4-hydroxybenzyl)phosphonate, a reaction product between 5,7-bis(1,1-dimethylethyl)-3-hydroxy-2(3H)-benzofuranone and o-xylene, 2,6-di-tert-butyl-4-(4,6-bis(octylthio)-1,3,5-triazine-2-ylamino)phenol, DL-a-tocophenol (vitamin E), 2,6-bis(α-methylbenzyl)-4-methylphenol, 2,6-bis(α-methylbenzyl)-4-nonylphenol, bis[3,3-bis-(4'-hydroxy-3'-tert-butyl-phenyl)butyric acid]glycol ester, 2,6-di-tert-butyl-p-cresol, 2,6-diphenyl-4-octadecyloxyphenol, stearyl(3,5-di-tert-butyl-4-hydroxyphenyl)propionate, distearyl(3,5-di-tert-butyl-4-hydroxybenzyl)phosphonate, tridecyl-3,5-di-tert-butyl-4-hydroxybenzyl thioacetate, thiodiethylene-bis[(3,5-di-tert-butyl-4-hydroxyphenyepropionate], 4,4'-thiobis(6-tert-butyl-m-cresol), 2-octylthio-4,6-di(3,5-di-tert-butyl-4-hydroxyphenoxy)-s-triazine, 2,2'-methylenebis(4-methyl-6-tert-butylphenol), bis[3,3-bis(4-hydroxy-3-tert-butylphenyl) butyric acid]glycol ester, 4,4'-butylidenebis(2,6-di-tert-butylphenol), 4,4'-butylidenebis(6-tert-butyl-3-methylphenol), 2,2'-ethylidenebis(4,6-di-tert-butylphenol), 1,1,3-tris(2-methyl-4-hydroxy-5-tert-butylphenyl)butane, bis[2-tert-butyl-4-methyl-6-(2-hydroxy-3-tert-butyl-5-methylbenzyl)phenyl]terephthalate, 1,3,5-tris(2,6-dimethyl-3-hydroxy-4-tert-butylbenzyl)isocyanurate, 1,3,5-tris(3,5-di-tert-butyl-4-hydroxybenzyl)isocyanurate, 1,3,5-tris(3,5-di-tert-butyl-4-hydroxybenzyl)-2,4,6-trimethylbenzene, 1,3,5-tris[(3,5-di-tert-butyl-4-hydroxyphenyl) propionyloxyethyl]isocyanurate, tetrakis[methylene-3-(3', 5'-di-tert-butyl-4'-hydroxyphenyl)propionate]methane, 2-tert-butyl-4-methyl-6-(2-acryloyloxy-3-tert-butyl-5-methylbenzyl)phenol, 3,9-bis [2-(3-tert-butyl-4-hydroxy-5-methylhydrocinnamoyloxy)-1,1-dimethylethyl]-2,4,8,10-tetraoxaspiro[5.5]undecane, triethylene glycol-bis[β-(3-tert-butyl-4-hydroxy-3,5-di-tert-butylphenyl)phosphite, tris[3,5-di-tert-butyl-4-hydroxyphenyl)propionyloxyethyl]isocyanurate, 2,6-bis(2-hydroxy-3-tert-butyl-5-methyl)4-methylphenol, tris(2,6-dimethyl-4-tert-butyl-3-hydroxyphenylmethyl) isocyanurate, bis(4-tert-butyl-3-hydroxy-2,6-dimethylbenzyl)dithio)terephthalate, 2,6-bis(α,α-dimethylbenzyl)-4-nonylphenol, 4,4'-cyclohexylidenebis(2-cyclohexylphenol), N-stearoyl-p-aminophenol, 2,2-[(2-hydroxy-5-methyl-m-phenylene)bis(hexahydro-4,7-methanoindanylene)], 1,6-hexanediol-bis[3-(3,5-di-tert-butyl-4-hydroxyphenyl)propionate], distearyl[2-(3-tert-butyl-5-methyl-4-hydroxybenzyl)malonate], 3-(3,5-di-tert-butyl-4-hydroxyphenylamino)-2,4-dioctylthio-s-triazine, 2,2'-thiobis(6-tert-butyl-p-cresol), 6-(3,5-di-tert-butyl-4-hydroxyphenylamino)-2,4-dioctylthio-s-triazine, 2,4-bis(3,5-di-tert-butyl-4-hydroxyphenoxy)-6-octylthio-s-triazine, dioctadecyl-4-hydroxy-3,5-di-tert-butylbenzyl phosphonate, 1,6-bis[3-(3,5-di-tert-butyl-4-hydroxyphenyl)propionylamino]hexane, diethyl(3,5-di-tert-butyl-4-hydroxyphenyl)phosphonate, calcium (3,5-di-tert-butyl-4-hydroxybenzylmonoethyl phosphonate, 4-phospha-3,5,8-trioxabicyclo[2,2,2]octylmethyl-3-(4-hydroxy-3,5-di-tert-butylphenyl)propionate, 2,4-dimethyl-6-(α-methylcyclohexyl)phenol, 2,2'-dihydroxy-3,3'-bis(α-methylcyclohexyl)-5,5'-dimethyldiphenylmethane, 1,4-benzenedicarboxylic acid-bis[2-(1,1-dimethylethyl)-6-[[3-(1,1-dimethylethyl)-2-hydroxy-5-methylphenyl]methyl]-4-methylphenyl], N,N'-bis[2-[2-(3,5-di-tert-butyl-4-hydroxyphenyl)ethylcarbonyloxy]ethyl]oxamide, 4,4'-methylenebis(2,6-di-tert-butylphenol), 2,6-di-tert-butyl-α-dimethylamino-4-cresol, ethylenebis[3,3'-bis(4-hydroxy-3-tert-butylphenyebutyrate, 2,2'-bis(4-[2-(4-hydroxy-3,5-di-tert-butylhydrocinnamoyl)ethoxy]phenyl)isopropane, N,N'-(1,3-propanediyl)bis[3,5-di-tert-butyl-4-hydroxybenzenepropanamide], and 3-(3,5-dialkyl-4-hydroxyphenyl)propionic acid derivatives such as octyl-3, 5-di-tert-butyl-4-hydroxy-hydrocinnamic acid, stearyl-3-(3, 5-di-tert-butyl-4-hydroxyphenyl)propionic acid amide, palmityl-3-(3,5-di-tert-butyl-4-hydroxyphenyl)propionic acid amide, myristyl-3-(3,5-di-tert-butyl-4-hydroxyphenyl) propionic acid amide and lauryl-3-(3,5-di-tert-butyl-4-hydroxyphenyl)propionic acid amide.

In the present invention, the phenolic antioxidant is particularly preferably a compound represented by the Formula (1) wherein $R^1$ and $R^2$ are not hydrogen atoms at the same time, such as 1,3,5-tris(3,5-di-tert-butyl-4-hydroxybenzyl)-s-triazine-2,4,6(1H,3H,5H)-trione, 1,3,5-tris(3,5-di-tert-butyl-4-hydroxybenzyl)isocyanurate, 1,1,3-tris(2-methyl-5-tert-butyl-4-hydroxyphenyl)butane, 4,4'-butylidenebis(3-methyl-6-tert-butylphenol), 1,1,3-tris(2-methyl-4-hydroxy-5-tert-butylphenyl)butane, n-octadecyl-3-(3',5'-di-tert-butyl-4-hydroxyphenyl)propionate, tetrakis(methylene-3-(3,5-di-tert-4-hydroxyphenyepropionate)methane, triethylene glycol-bis(3-tert-butyl-4-hydroxy-5-methylphenyl)propionate, 3,9-bis{1,1-dimethyl-2-(3-tert-butyl-4-hydroxy-5-methylphenyepropionyloxy}-2,4,8,10-tetraoxaspiro[5,5]undecane or 1,3,5-trimethyl-2,4,6-tris(3,5-di-tert-butyl-4-hydroxybenzyl)benzene.

In the thermal stabilizer composition of the present invention, it is more preferred that $R^1$, $R^2$ and $R^3$ in the Formula (1) be a tert-butyl group, a hydrogen atom and a methyl group, respectively, or that $R^1$, $R^2$ and $R^3$ in the Formula (2) be a tert-butyl group, a hydrogen atom and a methyl group, respectively. It is still more preferred that the phenolic antioxidant have a molecular weight in a range of 300 to 2,000. When the molecular weight is less than 300, the phenolic antioxidant is likely to be volatile and may cause an unpleasant odor during processing and adversely affect the outer appearance of the resulting molded article, whereas when the molecular weight is greater than 2,000, the phenolic antioxidant may have poor compatibility with a synthetic resin and its antioxidative effect may be small with respect to the added amount.

Next, the phosphorus-based antioxidant according to the thermal stabilizer composition of the present invention will be described.

In the thermal stabilizer composition of the present invention, any phosphorus-based antioxidant can be used as long as it has a phosphite structure; however, compounds represented by the following Formulae (4) to (8) are preferred.

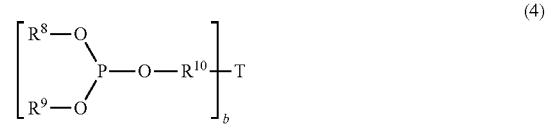

(4)

In the Formula (4), $R^8$ and $R^9$ each independently represent an alkyl group having 1 to 40 carbon atoms, an aryl group having 6 to 40 carbon atoms, an arylalkyl group having 7 to 40 carbon atoms, a heterocycle-containing group having 3 to 25 carbon atoms or a combination thereof, and $R^8$ and $R^9$ are optionally bound together to form a cyclic group. Further, $R^{10}$ represents a direct bond, an alkylidene group having 1 to 40 carbon atoms or an arylene group having 6 to 40 carbon atoms.

In the Formula (4), b represents an integer of 1 to 3; when b is 1, T represents a hydrogen atom, an alkyl group having 1 to 40 carbon atoms, an aryl group having 6 to 40 carbon atoms or a heterocycle-containing group having 3 to 25 carbon atoms; when b is 2, T represents an alkylidene group having 1 to 40 carbon atoms, an arylene group having 6 to 40 carbon atoms, —S— or a group represented by the below-described Formula (3); and when b is 3, T represents an alkanetriyl group having 1 to 40 carbon atoms.

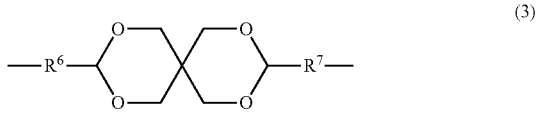
(3)

In the Formula (3), $R^6$ and $R^7$ each independently represent an alkylidene group having 1 to 40 carbon atoms or an arylene group having 6 to 40 carbon atoms. The alkyl group having 1 to 40 carbon atoms, aryl group having 6 to 40 carbon atoms or arylalkyl group having 7 to 40 carbon atoms that is represented by $R^8$ and $R^9$ in the Formula (4) is the same as the alkyl group having 1 to 40 carbon atoms, aryl group having 6 to 40 carbon atoms or arylalkyl group having 7 to 40 carbon atoms that is represented by X in the above-described Formula (2).

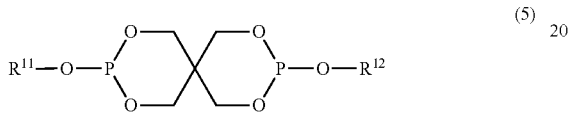
(5)

In the Formula (5), $R^{11}$ and $R^{12}$ each independently represent an alkyl group having 1 to 40 carbon atoms or an aryl group having 6 to 40 carbon atoms.

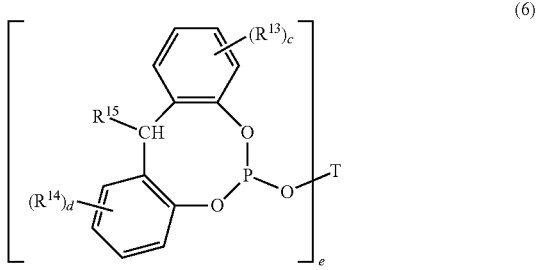
(6)

In the Formula (6), $R^{13}$ and $R^{14}$ each independently represent a hydrogen atom or an alkyl group having 1 to 10 carbon atoms, and $R^{15}$ represents a hydrogen atom or an alkyl group having 1 to 4 carbon atoms. T represents the same as the T in the Formula (4); and c, d and e represent an integer of 0 to 4, an integer of 0 to 4 and an integer of 1 to 3, respectively.

When c is 2 or larger, plural $R^{13}$s are optionally the same or different. Further, when d is 2 or larger, plural $R^{14}$s are optionally the same or different. When e is 1, T represents a hydrogen atom, an alkyl group having 1 to 40 carbon atoms, an aryl group having 6 to 40 carbon atoms or a heterocycle-containing group having 3 to 25 carbon atoms; when e is 2, T represents an alkylidene group having 1 to 40 carbon atoms, an arylene group having 6 to 40 carbon atoms, —S— or a group represented by the Formula (3); and when e is 3, T represents an alkanetriyl group having 1 to 40 carbon atoms.

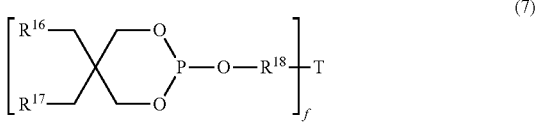
(7)

In the Formula (7), $R^{16}$ and $R^{17}$ each independently represent an alkyl group having 1 to 40 carbon atoms, an alkoxy group having 1 to 40 carbon atoms, an aryl group having 6 to 40 carbon atoms, an arylalkyl group having 7 to 40 carbon atoms or a heterocycle-containing group having 3 to 25 carbon atoms; $R^{18}$ represents an alkylidene group having 1 to 40 carbon atoms or an arylene group having 6 to 40 carbon atoms; and f represents an integer of 1 to 3.

When f is 1, T represents a hydrogen atom, an alkyl group having 1 to 40 carbon atoms, an aryl group having 6 to 40 carbon atoms or a heterocycle-containing group having 3 to 25 carbon atoms; when f is 2, T represents an alkylidene group having 1 to 40 carbon atoms, an arylene group having 6 to 40 carbon atoms, —S— or a group represented by the Formula (3); and when f is 3, T represents an alkanetriyl group having 1 to 40 carbon atoms.

(8)

In the Formula (8), $R^{19}$, $R^{20}$ and $R^{21}$ each independently represent a hydrogen atom, an alkyl group having 1 to 40 carbon atoms, an aryl group having 6 to 40 carbon atoms, an arylalkyl group having 7 to 40 carbon atoms or a heterocycle-containing group having 3 to 25 carbon atoms, with a proviso that $R^{19}$, $R^{20}$ and $R^{21}$ are not hydrogen atoms at the same time.

Examples of the alkyl group having 1 to 40 carbon atoms, aryl group having 6 to 40 carbon atoms and arylalkyl group having 7 to 40 carbon atoms that may be represented by $R^8$ and $R^9$ in the Formula (4) include the same ones as those exemplified above for the Formula (2).

Examples of the heterocycle-containing group having 3 to 25 carbon atoms that may be represented by $R^8$ and $R^9$ in the Formula (4) include pyridyl, pyrimidyl, pyridazyl, piperidyl, pyranyl, pyrazolyl, triazyl, pyrrolyl, quinolyl, isoquinolyl, imidazolyl, benzimidazolyl, triazolyl, furyl, furanyl, benzofuranyl, thienyl, thiophenyl, benzothiophenyl, thiadiazolyl, thiazolyl, benzothiazolyl, oxazolyl, benzoxazolyl, isothiazolyl, isoxazolyl, indolyl, 2-pyrrolidinon-1-yl, 2-piperidon-1-yl, 2,4-dioxyimidazolidin-3-yl, 2,4-dioxyoxazolidin-3-yl, benzotriazolyl, and isocyanurate ring-containing groups.

The cyclic group formed by binding of $R^8$ and $R^9$ in the Formula (4) refers to a group which is formed by linking of the above-exemplified alkyl groups, aryl groups, arylalkyl groups, heterocycle-containing groups and the like and contains a phosphorus atom in a cyclic structure and, as long as its number of carbon atoms is within a range of 3 to 25, the cyclic structure can separately contain a monocycle, a complex ring, a ring set or the like.

The alkylidene group having 1 to 40 carbon atoms or arylene group having 6 to 40 carbon atoms that is represented by $R^{10}$ in the Formula (4) is the same as the one represented by $R^6$ and $R^7$ in the Formula (3).

The alkyl group having 1 to 40 carbon atoms, aryl group having 6 to 40 carbon atoms, alkylidene group having 1 to 40 carbon atoms, arylene group having 6 to 40 carbon atoms or alkanetriyl group having 1 to 40 carbon atoms that is represented by T in the Formula (4) is the same as the alkyl group having 1 to 40 carbon atoms, aryl group having 6 to 40 carbon atoms, alkylidene group having 1 to 40 carbon atoms, arylene group having 6 to 40 carbon atoms or alkanetriyl group having 1 to 40 carbon atoms that is represented by X in the Formula (2).

The heterocycle-containing groups having 3 to 25 carbon atoms that may be represented by T in the Formula (4) are the same as those exemplified above for $R^8$ and $R^9$.

The alkyl group having 1 to 40 carbon atoms or aryl group having 6 to 40 carbon atoms that is represented by $R^{11}$ and $R^{12}$ in the Formula (5) is the same as the alkyl group having 1 to 40 carbon atoms or aryl group having 6 to 40 carbon atoms that is represented by $R^8$ and $R^9$ in the Formula (4).

Examples of the alkyl group having 1 to 10 carbon atoms that may be represented by $R^{13}$ and $R^{14}$ in the Formula (6) include methyl, ethyl, propyl, iso-propyl, cyclopropyl, butyl, sec-butyl, tert-butyl, iso-butyl, pentyl, iso-pentyl, tert-pentyl, cyclopentyl, 4-ethyl-2-methylheptyl, hexyl, 2-methylhexyl, 3-methylhexyl, cyclohexyl, 4-methylcyclohexyl, 2,4-dimethylhexyl, cyclohexyl, 1,2,4-trimethylcyclohexyl, heptyl, 2-heptyl, 3-heptyl, iso-heptyl, tert-heptyl, 1-octyl, iso-octyl and tert-octyl.

Examples of the alkyl group having 1 to 4 carbon atoms that may be represented by $R^{15}$ in the Formula (6) include methyl, ethyl, propyl, iso-propyl, cyclopropyl, butyl, sec-butyl, tert-butyl and iso-butyl.

In the Formula (6), T represents the same as the T in the Formula (4), except that b in the Formula (4) is replaced by e.

Examples of the alkyl group having 1 to 40 carbon atoms, alkoxy group having 1 to 40 carbon atoms, aryl group having 6 to 40 carbon atoms and arylalkyl group having 7 to 40 carbon atoms that may be represented by $R^{16}$ and $R^{17}$ in the Formula (7) include those alkyl groups having 1 to 40 carbon atoms, alkoxy groups having 1 to 40 carbon atoms, aryl groups having 6 to 40 carbon atoms and arylalkyl groups having 7 to 40 carbon atoms that are exemplified for X in the Formula (2).

Examples of the alkylidene group having 1 to 40 carbon atoms and arylene group having 6 to 40 carbon atoms that may be represented by $R^{18}$ in the Formula (7) include the same ones as those exemplified for $R^6$ and $R^7$ in the Formula (3).

Examples of the heterocycle-containing group having 3 to 25 carbon atoms that may be represented by $R^{16}$ and $R^{17}$ in the Formula (7) include the same heterocycle-containing groups having 3 to 25 carbon atoms that may be represented by $R^8$ and $R^9$ in the Formula (4).

Examples of the alkyl group having 1 to 40 carbon atoms, aryl group having 6 to 40 carbon atoms, arylalkyl group having 7 to 40 carbon atoms and heterocycle-containing group having 3 to 25 carbon atoms that may be represented by $R^{19}$, $R^{20}$ and $R^{21}$ in the Formula (8) include the same ones as those exemplified for $R^8$ and $R^9$ in the Formula (4).

In the thermal stabilizer composition of the present invention, the phosphorus-based antioxidant also encompasses those that are added to and blended or emulsified with an inert solvent such as an aliphatic hydrocarbon (e.g., butane, pentane, hexane, heptane or isooctane), an alicyclic hydrocarbon (e.g., cyclopentane, cyclohexane or methylcyclohexane), an aromatic hydrocarbon (e.g., toluene, xylene or ethylbenzene), a gasoline fraction or a hydrogenated diesel fraction; and blends of plural phosphorus-based antioxidants.

In the thermal stabilizer composition of the present invention, the alkyl group, alkoxy group, arylalkyl group, alkylidene group, alkanetriyl group or alkanetetrayl group of the phosphorus-based antioxidant is optionally substituted at a methylene group moiety with any of the below-described substituent, and these groups are also optionally branched.

Examples of the substituent include ethylenically unsaturated groups such as vinyl, allyl, acryl and methacryl; halogen atoms such as fluorine, chlorine, bromine and iodine; acyl groups such as acetyl, 2-chloroacetyl, propionyl, octanoyl, acryloyl, methacryloyl, phenylcarbonyl(benzoyl), phthaloyl, 4-trifluoromethylbenzoyl, pivaloyl, salicyloyl, oxaloyl, stearoyl, methoxycarbonyl, ethoxycarbonyl, tert-butoxycarbonyl, n-octadecyloxycarbonyl and carbamoyl; acyloxy groups such as acetyloxy and benzoyloxy; an amino group; substituted amino groups such as ethylamino, dimethylamino, diethylamino, butylamino, cyclopentylamino, 2-ethylhexylamino, dodecylamino, anilino, chlorophenylamino, toluidino, anisidino, N-methyl-anilino, diphenylamino, naphthylamino, 2-pyridylamino, methoxycarbonylamino, phenoxycarbonylamino, acetylamino, benzoylamino, formylamino, pivaloylamino, lauroylamino, carbamoylamino, N,N-dimethylaminocarbonylamino, N,N-diethylaminocarbonylamino, morpholinocarbonylamino, methoxycarbonylamino, ethoxycarbonylamino, tert-butoxycarbonylamino, n-octadecyloxycarbonylamino, N-methyl-methoxycarbonylamino, phenoxycarbonylamino, sulfamoylamino, N,N-dimethylaminosulfonylamino, methylsulfonylamino, butylsulfonylamino and phenylsulfonylamino; a sulfonamide group; a sulfonyl group; a carboxyl group; a cyano group; a sulfo group; a hydroxyl group; a nitro group; a mercapto group; an imide group; a carbamoyl group; a sulfonamide group; a phosphonate group; a phosphate group; and salts of a carboxyl group, a sulfo group, a phosphonate group and a phosphate group. In the present invention, unless otherwise specified, each substituent may further contain the above described substituent. When the above described substituent contains a carbon atom(s), the above-described number of the carbon atom(s) in each group includes the carbon atom(s) in the substituent.

Concrete structures of the phosphorus-based antioxidant having a phosphite structure in the present invention are exemplified below; however, the present invention is not restricted to the following compounds by any means.

Examples of the phosphorus-based antioxidant represented by the Formula (4) include triethyl phosphite, triphenyl phosphite, diisooctyl phosphite, heptakis triphosphite, triisodecyl phosphite, diphenylisooctyl phosphite, diisooctylphenyl phosphite, diphenylisodecyl phosphite, diphenylisooctyl phosphite, diphenyltridecyl phosphite, triisooctyl phosphite, trilauryl phosphite, diphenyl phosphite, tris (dipropylene glycol)phosphite, dinonylphenylbis (nonylphenyl)phosphite, trisnonylphenyl phosphite, tris(4-hydroxy-2,5-di-tert-butylphenyephosphite, tris(2-ethylhexyl)phosphite, diphenyl mono-o-phenyl phosphite, tris(dinonylphenyl)phosphite, diisodecylmonophenyl phosphite, tris(tridecyl)phosphite, diphenylmono-2-ethylhexyl phosphite, diphenylmonotridecyl phosphite, diphenyl hydrogen phosphite, 1,1'-dimethyl-2,2'-oxydiethylene-bis (diphenyl phosphite), bis(2,4-di-tert-butyl-6-methylphenyl)-ethyl phosphite, dioleyl hydrogen phosphite, trilauryl trithiophosphite, bis(tridecyl)phosphite, di(decyl)monophenyl phosphite, tris(2,4-di-tert-butylphenyl)phosphite, tris(2,4-di-tert-butyl-5-methylphenyephosphite, tris[2-tert-butyl-4-(3-tert-butyl-4-hydroxy-5-methylphenylthio)-5-methylphenyl]phosphite, tridecyl phosphite, octyldiphenyl phosphite and tristearyl phosphite.

Examples of the phosphorus-based antioxidant represented by the Formula (5) include diisodecylpentaerythritol diphosphite, distearylpentaerythritol diphosphite, di(tridecyl)pentaerythritol diphosphite, di(nonylphenyl)pentaerythritol diphosphite, 3,9-bis(2,4-di-tert-butylphenoxy)-2,4,8, 10-tetraoxa-3,9-diphosphaspiro[5.5]undecane, 3,9-bis(2,6-di-tert-butyl-4-methylphenoxy)-2,4,8,10-tetraoxa-3,9-diphosphaspiro[5.5]undecane, bis(2,4,6-tri-tert-butylphenyl)pentaerythritol diphosphite, bis(2,4-dicumylphenyl)pentaerythritol diphosphite, tetraphenyl-tetra(tridecyl)pentaerythritol tetraphosphite and 3,9-bis(4-nonylphenoxy)-2,4,8,10-tetraoxa-3,9-diphosphaspiro[5,5]undecane.

Examples of the phosphorus-based antioxidant represented by the Formula (6) include 2,2'-methylenebis(4,6-di-tert-butylphenyl)octyl phosphite, 2,2'-methylenebis(4,6-di-tert-butylphenyl)-2-ethylhexyl phosphite, 2,2'-methylenebis (4,6-di-tert-butylphenyl)nonyl phosphite, 2,2'-methylenebis (4,6-di-tert-butylphenyl)-octadecyl phosphite, 6,6',6"-[nitrilotris(ethyleneoxy)]tris(2,4,8,10-tetra-tert-butyldibenzo[d,f][1,3,2]dioxaphosphepin), and bis[2,2'-methylene-bis(4,6-di-tert-amylphenyl)-4,4'-isopropylidene diphenyldiphosphite.

Examples of the phosphorus-based antioxidant represented by the Formula (7) include 5,5-diethyl-2-(2,4,6-tri-tert-butylphenoxy)-1,3,2-dioxaphosphinane Examples of the phosphorus-based antioxidant represented by the Formula (8) include triphenyl phosphite, octyldiphenyl phosphite, decyldiphenyl phosphite, trioctylphenyl phosphite, octadecyldiphenyl phosphite, tris(methylphenyl)phosphite, tris(2,4-di-tert-butylphenyl)phosphite, tris(ethylphenyl)phosphite, trioctyl phosphite, tridecyl phosphite, triundecyl phosphite, tris(tridecyl phosphite), trioctadecyl phosphite, and dilauryl hydrogen phosphite.

Examples of a phosphorus-based antioxidant having a phosphite structure represented by other than the Formulae (4) to (8) include 2,2'-ethylidenebis(4,6-di-tert-butylphenyl) fluorophosphite, tetrakis(2,4-di-tert-butylphenyl)biphenylene diphosphonite, tetraphenyldipropylglycol diphosphite, tetra(tridecyl)isopropylidene diphenol diphosphite, tetra(tridecyl)-4,4'-n-butylidenebis(2-tert-butyl-5-methyl-phenol)diphosphite, hexa(tridecyl)-1,1,3-tris(2-methyl-4-hydroxy-5-tert-butylphenyl)butane triphosphite, 9,10-dihydro-9-oxa-10-phosphaphenanthrene-10-oxide, 4,4'-butylidenebis(3-methyl-6-tert-butylphenylditridecyl) phosphite, tris(2-[(2,4,8,10-tetrakis-tert-butyldibenzo[d,f] [1,3,2]dioxaphosphepin-6-yl)oxy]ethyl)amine and 2,4,6-tri-tert-butylphenyl-2-butyl-2-ethyl-1,3-propanediol phosphite.

In the thermal stabilizer composition of the present invention, two or more of the phosphorus-based antioxidant having a phosphite structure according to the present invention may be used in combination.

As the phosphorus-based antioxidant according to the thermal stabilizer composition of the present invention, a compound having a melting point of 100° C. or lower can be preferably used because it allows the effects of the present invention to be exhibited prominently. Examples of a phosphite compound having a melting point of 100° C. or lower include tridecyl phosphite, triisodecyl phosphite, triphenyl phosphite, trisnonylphenyl phosphite, distearylpentaerythritol diphosphite, bisnonylphenylpentaerythritol diphosphite, phosphites of bisphenol A and C12-15 mixed alcohol, diphenyl-2-ethylhexyl phosphite, diphenylisodecyl phosphite, phosphites of 1,1-butylidenebis(2-methyl-4-hydroxy-5-tert-butylphenye and tridecyl alcohols, and phosphites of 1,1,3-tris(2-methyl-4-hydroxy-5-tert-butylphenyl)butane and tridecyl alcohols.

The thermal stabilizer composition of the present invention comprises 0.001 to 10 parts by mass, preferably 0.01 to 5 parts by mass, more preferably 0.03 to 3 parts by mass of a phenolic antioxidant with respect to 100 parts by mass of the above-described phosphorus-based antioxidant having a phosphite structure. When the amount of the phenolic antioxidant is less than 0.001 parts by mass, the effects of the present invention may not be attained, whereas when the amount is greater than 10 parts by mass, the phenolic antioxidant cannot be dissolved in the phosphorus-based antioxidant and may thus remain. Residual phenolic antioxidant is not preferred because it may adversely affect the processability by clogging the screen when the thermal stabilizer composition is fed in a liquid form at the time of processing.

In the thermal stabilizer composition of the present invention, resin additives that are usually and generally used can be incorporated in such a range that does not impair the expected effects of the present invention. Examples of the resin additives include a thioether-based antioxidant, an ultraviolet absorber, a hindered amine-based light stabilizer, a nucleating agent, a flame retardant, a flame retardant aid, a lubricant, a filler, a metallic soap, a hydrotalcite, an antistatic agent, a pigment and a dye. These resin additives may be incorporated into the thermal stabilizer composition of the present invention, or they may be added to a synthetic resin separately from the thermal stabilizer composition of the present invention.

Examples of the thioether-based antioxidant include tetrakis[methylene-3-(laurylthio)propionate]methane, bis (methyl-4-[3-n-alkyl(C12/C14)thiopropionyloxy]-5-tert-butylphenyl)sulfide, ditridecyl-3,3'-thiodipropionate, dilauryl-3,3'-thiodipropionate, dimyristyl-3,3'-thiodipropionate, distearyl-3,3'-thiodipropionate, lauryl/stearyl thiodipropionate, 4,4'-thiobis(6-tert-butyl-m-cresol) and distearyl-disulfide.

In cases where any of the above-described thioether-based antioxidants is used, it is preferably used such that, when the thermal stabilizer composition of the present invention is incorporated into a synthetic resin, the amount of the thioether-based antioxidant is 0.001 to 10 parts by mass, more preferably 0.01 to 0.5 parts by mass, with respect to 100 parts by mass of the synthetic resin.

Examples of the ultraviolet absorber include 2-hydroxybenzophenones such as 2,4-dihydroxybenzophenone, 2-hydroxy-4-methoxybenzophenone, 2-hydroxy-4-octoxybenzophenone and 5,5'-methylene-bis(2-hydroxy-4-methoxybenzophenone); 2-(2-hydroxyphenyl) benzotriazoles such as 2-(2-hydroxy-5-methylphenyl) benzotriazole, 2-(2-hydroxy-5-tert-octylphenyl) benzotriazole, 2-(2-hydroxy-3,5-di-tert-butylphenyl)-5-chlorobenzotriazole, 2-(2-hydroxy-3-tert-butyl-5-methylphenyl)-5-chlorobenzotriazole, 2-(2-hydroxy-3,5-dicumylphenyl)benzotriazole, 2,2'-methylene-bis(4-tert-octyl-6-benzotriazolylphenol), polyethylene glycol esters of 2-(2-hydroxy-3-tert-butyl-5-carboxyphenyl)benzotriazole, 2-[2-hydroxy-3-(2-acryloyloxyethyl)-5-methylphenyl]benzotriazole, 2-[2-hydroxy-3-(2-methacryloyloxyethyl)-5-tert-butylphenyl]benzotriazole, 2-[2-hydroxy-3-(2-methacryloyloxyethyl)-5-tert-octylphenyl]benzotriazole, 2-[2-hydroxy-3-(2-methacryloyloxyethyl)-5-tert-butylphenyl]-5-chlorobenzotriazole, 2-[2-hydroxy-5-(2-methacryloyloxyethyl)phenyl]benzotriazole, 2-[2-hydroxy-3-tert-butyl-5-(2-methacryloyloxyethyl)phenyl] benzotriazole, 2-[2-hydroxy-3-tert-amyl-5-(2-methacryloyloxyethyl)phenyl]benzotriazole, 2-[2-hydroxy-3-tert-butyl-5-(3-methacryloyloxypropyl)phenyl]-5-chlorobenzotriazole, 2-[2-hydroxy-4-(2-methacryloyloxymethyl)phenyl]benzotriazole, 2-[2-hydroxy-4-(3-methacryloyloxy-2-hydroxypropyl)phenyl] benzotriazole and 2-[2-hydroxy-4-(3-methacryloyloxypropyl)phenyl]benzotriazole; 2-(2- hydroxyphenyl)-4,6-diaryl-1,3,5-triazines such as 2-(2-hydroxy-4-methoxyphenyl)-4,6-diphenyl-1,3,5-triazine, 2-(2-hydroxy-4-hexyloxyphenyl)-4,6-diphenyl-1,3,5-triazine, 2-(2-hydroxy-4-octoxyphenyl)-4,6-bis(2,4-dimethylphenyl)-1,3,5-triazine, 2-[2-hydroxy-4-(3-C12 to C13 mixed alkoxy-2-hydroxypropoxy)phenyl]-4,6-bis(2,4-dimethylphenyl)-1,3,5-triazine, 2-[2-hydroxy-4-(2-acryloyloxyethoxy)phenyl]-4,6-bis(4-methylphenyl)-1,3,5-triazine, 2-(2,4-dihydroxy-3-allylphenyl)-4,6-bis(2,4-dimethylphenyl)-1,3,5-triazine and 2,4,6-tris(2-hydroxy-3-methyl-4-hexyloxyphenyl)-1,3,5-triazine; benzoates such as phenyl salicylate, resorcinol monobenzoate, 2,4-di-tert-butylphenyl-3,5-di-tert-butyl-4-hydroxybenzoate, octyl(3,5-di-tert-butyl-4-hydroxy)benzoate, dodecyl(3,5-di-tert-butyl-4-hydroxy)benzoate, tetradecyl(3,5-di-tert-butyl-4-hydroxy)benzoate, hexadecyl(3,5-di-tert-butyl-4-hydroxy)benzoate, octadecyl(3,5-di-tert-butyl-4-hydroxy)benzoate and behenyl (3,5-di-tert-butyl-4-hydroxy)benzoate; substituted oxanilides such as 2-ethyl-2'-ethoxyoxanilide and 2-ethoxy-4'-dodecyloxanilide; cyanoacrylates such as ethyl-α-cyano-β,β-diphenylacrylate and methyl-2-cyano-3-methyl-3-(p-methoxyphenyl)acrylate; and a variety of metal salts and metal chelates, particularly salts and chelates of nickel and chromium.

In cases where any of the above-described ultraviolet absorbers is used, it is preferably used such that, when the thermal stabilizer composition of the present invention is incorporated into a synthetic resin, the amount of the ultraviolet absorber is 0.001 to 5 parts by mass, more preferably 0.01 to 0.5 parts by mass, with respect to 100 parts by mass of the synthetic resin.

Examples of the hindered amine-based light stabilizer include 2,2,6,6-tetramethyl-4-piperidyl stearate, 1,2,2,6,6-pentamethyl-4-piperidyl stearate, 2,2,6,6-tetramethyl-4-piperidyl benzoate, bis(2,2,6,6-tetramethyl-4-piperidyl)sebacate, tetrakis(2,2,6,6-tetramethyl-4-piperidyl)-1,2,3,4-butanetetracarboxylate, tetrakis(1,2,2,6,6-pentamethyl-4-piperidyl)-1,2,3,4-butanetetracarboxylate, bis(2,2,6,6-tetramethyl-4-piperidyl)-di(tridecyl)-1,2,3,4-butanetetracarboxylate, bis(1,2,2,6,6-pentamethyl-4-piperidyl)-di(tridecyl)-1,2,3,4-butanetetracarboxylate, bis(1,2,2,4,4-pentamethyl-4-piperidyl)-2-butyl-2-(3,5-di-tert-butyl-4-hydroxybenzyl)malonate, 1-(2-hydroxyethyl)-2,2,6,6-tetramethyl-4-piperidinol/diethyl succinate polycondensates, 1,6-bis(2,2,6,6-tetramethyl-4-piperidylamino)hexane/2,4-dichloro-6-morpholino-s-triazine polycondensates, 1,6-bis(2,2,6,6-tetramethyl-4-piperidylamino)hexane/2,4-dichloro-6-tert-octylamino-s-triazine polycondensates, 1,5,8,12-tetrakis[2,4-bis(N-butyl-N-(2,2,6,6-tetramethyl-4-piperidyl)amino)-s-triazine-6-yl]-1,5,8,12-tetraazadodecane, 1,5,8,12-tetrakis[2,4-bis(N-butyl-N-(1,2,2,6,6-pentamethyl-4-piperidyeamino)-s-triazine-6-yl]-1,5,8,12-tetraazadodecane, 1,6,11-tris[2,4-bis(N-butyl-N-(2,2,6,6-tetramethyl-4-piperidyl)amino)-s-triazine-6-yl]aminoundecane, 1,6,11-tris[2,4-bis(N-butyl-N-(1,2,2,6,6-pentamethyl-4-piperidyl)amino)-s-triazine-6-yl]aminoundecane, bis{4-(1-octyloxy-2,2,6,6-tetramethyl)piperidyl}decanedionate, bis{4-(2,2,6,6-tetramethyl-1-undecyloxy)piperidyl}carbonate, and TINUVIN NOR 371 manufactured by Ciba Specialty Chemicals K.K.

In cases where any of the above-described hindered amine-based light stabilizers is used, it is preferably used such that, when the thermal stabilizer composition of the present invention is incorporated into a synthetic resin, the amount of the hindered amine-based light stabilizer is 0.001 to 5 parts by mass, more preferably 0.005 to 0.5 parts by mass, with respect to 100 parts by mass of the synthetic resin.

Examples of the nucleating agent include metal carboxylates such as sodium benzoate, aluminum 4-tert-butylbenzoate, sodium adipate and disodium bicyclo[2.2.1]heptane-2,3-dicarboxylate; metal phosphates such as sodium-bis(4-tert-butylphenyl)phosphate, sodium-2,2'-methylene-bis(4,6-di-tert-butylphenyl)phosphate and lithium-2,2'-methylene-bis(4,6-di-tert-butylphenyl)phosphate; polyhydric alcohol derivatives such as dibenzylidene sorbitol, bis(methylbenzylidene)sorbitol, bis(3,4-dimethylbenzylidene)sorbitol, bis(p-ethylbenzylidene)sorbitol and bis(dimethylbenzylidene)sorbitol; and amide compounds such as N,N',N"-tris[2-methylcyclohexyl]-1,2,3-propane tricarboxamide, N,N',N"-tricyclohexyl-1,3,5-benzene tricarboxamide, N,N-dicyclohexyl-naphthalene dicarboxamide and 1,3,5-tri(dimethylisopropoylamino)benzene.

In cases where any of the above-described nucleating agents is used, it is preferably used such that, when the thermal stabilizer composition of the present invention is incorporated into a synthetic resin, the amount of the nucleating agent is 0.001 to 5 parts by mass, more preferably 0.005 to 0.5 parts by mass, with respect to 100 parts by mass of the synthetic resin.

Examples of the flame retardant include aromatic phosphates such as triphenyl phosphate, tricresyl phosphate, trixylenyl phosphate, cresyldiphenyl phosphate, cresyl-2,6-dixylenyl phosphate, resorcinol-bis(diphenylphosphate), (1-methylethylidene)-4,1-phenylene tetraphenyldiphosphate, 1,3-phenylene-tetrakis(2,6-dimethylphenyl)phosphate, ADK STAB FP-500 (trade name, manufactured by ADEKA Corporation), ADK STAB FP-600 (trade name, manufactured by ADEKA Corporation) and ADK STAB FP-800 (trade name, manufactured by ADEKA Corporation); phosphonates such as divinyl phenylphosphonate, diallyl phenylphosphonate and (1-butenyl)phenylphosphonate; phosphinates such as phenyl diphenylphosphinate, methyl diphenylphosphinate and 9,10-dihydro-9-oxa-10-phosphaphenanthlene-10-oxide derivatives; phosphazene compounds such as bis(2-allylphenoxy)phosphazene and dicresylphosphazene; phosphorus-based flame retardants such as melamine phosphate, melamine pyrophosphate, melamine polyphosphate, melam polyphosphate, ammonium polyphosphate, piperazine phosphate, piperazine pyrophosphate, piperazine polyphosphate, phosphorus-containing vinylbenzyl compounds and red phosphorus; metal hydroxides such as magnesium hydroxide and aluminum hydroxide; and bromine-based flame retardants such as brominated bisphenol A-type epoxy resins, brominated phenol novolac-type epoxy resins, hexabromobenzene, pentabromotoluene, ethylene-bis(pentabromophenyl), ethylene-bis-tetrabromophthalimide, 1,2-dibromo-4-(1,2-dibromoethyl)cyclohexane, tetrabromocyclooctane, hexabromocyclododecane, bis(tribromophenoxy)ethane, brominated polyphenylene ether, brominated polystyrene, 2,4,6-tris(tribromophenoxy)-1,3,5-triazine, tribromophenyl maleimide, tribromophenyl acrylate, tribromophenyl methacrylate, tetrabromobisphenol A-type dimethacrylate, pentabromobenzyl acrylate and brominated styrene. These flame retardants are preferably used in combination with a drip inhibitor such as a fluorocarbon resin and/or a flame retardant aid such as a polyhydric alcohol or hydrotalcite.

In cases where any of the above-described flame retardants is used, it is preferably used such that, when the thermal stabilizer composition of the present invention is incorporated into a synthetic resin, the amount of the flame retardant is 0.01 to 50 parts by mass, more preferably 10 to 30 parts by mass, with respect to 100 parts by mass of the synthetic resin.

The above-described lubricant is added for the purposes of imparting the surface of the resulting molded article with lubricity and improving the damage-preventing effect. Examples of the lubricant include unsaturated fatty acid amides such as oleic acid amide and erucic acid amide; and saturated fatty acid amides such as behenic acid amide and stearic acid amide. These lubricants may be used individually, or two or more thereof may be used in combination.

In cases where any of the above-described lubricants is used, it is preferably used such that, when the thermal stabilizer composition of the present invention is incorporated into a synthetic resin, the amount of the lubricant is 0.01 to 2 parts by mass, more preferably 0.03 to 0.5 parts by mass, with respect to 100 parts by mass of the synthetic resin.

Examples of the filler include talc, mica, calcium carbonate, calcium oxide, calcium hydroxide, magnesium carbonate, magnesium hydroxide, magnesium oxide, magnesium sulfate, aluminum hydroxide, barium sulfate, glass powder, glass fibers, clays, dolomite, silica, alumina, potassium titanate whiskers, wollastonite and fibrous magnesium oxysulfate. The particle size of the filler (e.g., fiber diameter, fiber length and aspect ratio in the case of a fibrous filler) can be selected appropriately. In addition, as required, a surface-treated filler can also be used, as the filler.

In cases where any of the above-described fillers is used, it is preferably used such that, when the thermal stabilizer composition of the present invention is incorporated into a synthetic resin, the amount of the filler is 0.01 to 80 parts by mass, more preferably 1 to 50 parts by mass, with respect to 100 parts by mass of the synthetic resin.

As the metallic soap, salts formed by a metal, such as magnesium, calcium, aluminum or zinc, and a saturated or unsaturated fatty acid, such as lauric acid, myristic acid, palmitic acid, stearic acid, behenic acid or oleic acid, can be used.

In cases where any of the above-described metallic soaps is used, it is preferably used such that, when the thermal stabilizer composition of the present invention is incorporated into a synthetic resin, the amount of the metallic soap is 0.001 to 10 parts by mass, more preferably 0.01 to 5 parts by mass, with respect to 100 parts by mass of the synthetic resin.

The hydrotalcite is a complex salt compound which is known as a natural or synthetic product and composed of magnesium, aluminum, hydroxyl groups, a carbonate group and arbitrary crystal water, and examples thereof include hydrotalcites in which some of the magnesium or aluminum atoms are substituted with other metal such as an alkali metal or zinc; and hydrotalcites in which the hydroxyl group(s) and/or carbonate group is/are substituted with other anionic group(s), more specifically, hydrotalcites represented by the following Formula (9) in which a metal is substituted with an alkali metal. In addition, as an Al—Li hydrotalcite, a compound represented by the following Formula (10) can be used as well.

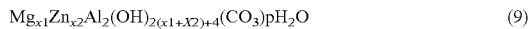
$$Mg_{x1}Zn_{x2}Al_2(OH)_{2(x1+x2)+4}(CO_3)pH_2O \quad (9)$$

In the Formula (9), x1 and x2 each represent a number that satisfies the conditions represented by the following formula;

$$0 \le x2/x1 < 10, \ 2 \le (x1+x2) \le 20$$

and p represents 0 or a positive number:

$$[Li_{1/3}Al_{2/3}(OH)_2] \cdot [A^{q-}_{1/3q} \cdot pH_2O] \quad (10)$$

In the Formula (10), $A^{q-}$ represents an anion having a valence of q; and p represents 0 or a positive number. Further, the carbonate anion in the above-described hydrotalcites may be partially substituted with other anion.

In these hydrotalcites, the crystal water may be dehydrated, and the hydrotalcites may be coated with, for example, a higher fatty acid such as stearic acid, a higher fatty acid metal salt such as alkali metal oleate, a metal organic sulfonate such as alkali metal dodecylbenzenesulfonate, a higher fatty acid amide, a higher fatty acid ester or a wax.

The hydrotalcites may be a naturally-occurring or synthetic hydrotalcite. Examples of a method of synthesizing such a compound include known methods that are described in Japanese Patent Publication (Kokoku) No. S46-2280, Japanese Patent Publication (Kokoku) No. S50-30039, Japanese Patent Publication (Kokoku) No. S51-29129, Japanese Patent Publication (Kokoku) No. H3-36839, Japanese Unexamined Patent Application Publication No. S61-174270, Japanese Unexamined Patent Application Publication No. H5-179052 and the like. Further, the above-exemplified hydrotalcites can be used without any restriction on the crystal structure, crystal particle and the like.

In cases where any of the above-described hydrotalcites is used, it is preferably used such that, when the thermal stabilizer composition of the present invention is incorporated into a synthetic resin, the amount of the hydrotalcite is 0.001 to 5 parts by mass, more preferably 0.05 to 3 parts by mass, with respect to 100 parts by mass of the synthetic resin.

Examples of the above-described antistatic agent include cationic antistatic agents such as fatty acid quaternary ammonium ion salts and polyamine quaternary salts; anionic antistatic agents such as higher alcohol phosphates, higher alcohol EO adducts, polyethylene glycol fatty acid esters, anionic alkyl sulfonates, higher alcohol sulfates, higher alcohol ethylene oxide adduct sulfates and higher alcohol ethylene oxide adduct phosphates; nonionic antistatic agents such as polyhydric alcohol fatty acid esters, polyglycol phosphates and polyoxyethylene alkyl allyl ethers; and amphoteric antistatic agents such as amphoteric alkyl betaines (e.g., alkyldimethylamino acetic acid betaine) and imidazoline-type amphoteric activators. These antistatic agents may be used individually, or two or more thereof may be used in combination.

In cases where any of the above-described antistatic agents is used, it is preferably used such that, when the thermal stabilizer composition of the present invention is incorporated into a synthetic resin, the amount of the antistatic agent is 0.03 to 2 parts by mass, more preferably 0.1 to 0.8 parts by mass, with respect to 100 parts by mass of the synthetic resin.

As the pigment, a commercially available pigment can also be used, and examples thereof include Pigment Red 1, 2, 3, 9, 10, 14, 17, 22, 23, 31, 38, 41, 48, 49, 88, 90, 97, 112, 119, 122, 123, 144, 149, 166, 168, 169, 170, 171, 177, 179, 180, 184, 185, 192, 200, 202, 209, 215, 216, 217, 220, 223, 224, 226, 227, 228, 240 and 254; Pigment Orange 13, 31, 34, 36, 38, 43, 46, 48, 49, 51, 52, 55, 59, 60, 61, 62, 64, 65 and 71; Pigment Yellow 1, 3, 12, 13, 14, 16, 17, 20, 24, 55, 60, 73, 81, 83, 86, 93, 95, 97, 98, 100, 109, 110, 113, 114, 117, 120, 125, 126, 127, 129, 137, 138, 139, 147, 148, 150, 151, 152, 153, 154, 166, 168, 175, 180 and 185; Pigment Green 7, 10 and 36; Pigment Blue 15, 15:1, 15:2, 15:3, 15:4, 15:5, 15:6, 22, 24, 56, 60, 61, 62 and 64; and Pigment Violet 1, 19, 23, 27, 29, 30, 32, 37, 40 and 50.

Examples of the dye include azo dyes, anthraquinone dyes, indigoid dyes, triarylmethane dyes, xanthene dyes, alizarin dyes, acridine dyes, stilbene dyes, thiazole dyes, naphthol dyes, quinoline dyes, nitro dyes, indamine dyes, oxazine dyes, phthalocyanine dyes and cyanine dyes, and a plurality of these dyes may be used in combination.

The thermal stabilizer composition of the present invention can be treated by adding thereto an adsorbent. The treatment with an adsorbent is preferred since it enables to further suppress the odor and remove impurities. Examples of the adsorbent include activated clay, activated charcoal, zeolite, inorganic and organic synthetic adsorbents, ion-exchange resins, adsorbent resins, silica gel, silica-alumina adsorbents, alumina gel, activated alumina and silicon dioxide.

The time of contact between the thermal stabilizer composition and the adsorbent can be determined as appropriate in accordance with the type and amount of the adsorbent. Further, after bringing the thermal stabilizer composition into contact with the adsorbent, the thermal stabilizer composition and the adsorbent can be separated from each other using a filter or the like.

Examples of a synthetic resin that can be stabilized by the thermal stabilizer composition of the present invention include thermoplastic resins, thermosetting resins, crystalline resins, amorphous resins, biodegradable resins, non-biodegradable resins, naturally-occurring resins, general-purpose resins, engineering resins and polymer alloys.

Next, the synthetic resin composition of the present invention will be described.

The synthetic resin composition of the present invention comprises 0.001 to 10 parts by mass of the thermal stabilizer composition of the present invention with respect to 100 parts by mass of a synthetic resin. Examples of a synthetic resin that can be used in the synthetic resin composition of the present invention include thermoplastic resins, such as α-olefin homopolymers or copolymers (e.g., polypropylene, low-density polyethylene, linear low-density polyethylene, high-density polyethylene, polybutene-1, poly-3-methylpentene, poly-4-methylpentene and ethylene-propylene copolymers), polyunsaturated compounds of these α-olefins and conjugated diene, unconjugated diene or the like, copolymers with acrylic acid, methacrylic acid, vinyl acetate or the like, linear polyesters and acid-modified polyesters (e.g., polyethylene terephthalate, polyethylene terephthalate-isophthalate, polyethylene terephthalate-paraoxybenzoate, and polybutylene terephthalate), biodegradable resins (e.g., aliphatic polyesters), liquid-crystal polyesters, polyamides (e.g., polycaprolactam and polyhexamethylene adipamide), liquid-crystal polyamides, polyimides, polystyrenes, copolymers (e.g., acrylonitrile-styrene copolymer (AS) resins, acrylonitrile-butadiene-styrene copolymer (ABS) resins, methyl methacrylate-butadiene-styrene copolymer (MBS) resins and heat-resistant ABS resins) composed of styrene and/or α-methylstyrene with other monomer(s) (e.g., maleic anhydride, phenylmaleimide, methyl methacrylate, butadiene or acrylonitrile), halogen-containing resins (e.g., polyvinyl chloride, polyvinylidene chloride, chlorinated polyethylene, chlorinated polypropylene, polyvinylidene fluoride, chlorinated rubbers, vinyl chloride-vinyl acetate copolymers, vinyl chloride-ethylene copolymers, vinyl chloride-vinylidene chloride copolymers, vinyl chloride-vinylidene chloride-vinyl acetate ternary copolymers, vinyl chloride-acrylate copolymers, vinyl chloride-maleate copolymers and vinyl chloride-cyclohexylmaleimide copolymers), (meth)acrylate polymers (e.g., methyl (meth)acrylate, ethyl (meth)acrylate and octyl (meth)acrylate), polyether ketones, polyvinyl acetates, polyvinyl formals, polyvinyl butyrals, polyvinyl alcohols, linear or branched polycarbonates, petroleum resins, coumarone resins, polyphenylene oxides, polyphenylene sulfides, thermoplastic polyurethanes and cellulose-based resins; thermosetting resins, such as epoxy resins, phenol resins, urea resins, melamine resins, unsaturated polyester resins and thermosetting polyurethanes; naturally-occurring resins, such as natural rubbers, microorganism-produced aliphatic polyesters (e.g., 3-hydroxybutyrate), microorganism-produced aliphatic polyamides, starch, cellulose, chitin/chitosan, and gluten/gelatin; general-purpose resins; engineering resins; and polymer alloys, and the synthetic resin may be any of these resins. The term "polymer alloy" used herein refers to a multi-component polymer system which may be a block polymer obtained by copolymerization or a polymer blend obtained by mixing or the like.

The synthetic resin may also be an elastomer (e.g., an isoprene rubber, a butadiene rubber, a butadiene-styrene copolymer rubber, a butadiene-acrylonitrile copolymer rubber, an acrylonitrile-butadiene-styrene copolymer rubber, a copolymer rubber of ethylene and α-olefin such as propylene or butene-1, or a ternary copolymer rubber of ethylene-α olefin and a non-conjugated diene such as ethylidene norbornene or cyclopentadiene), an α-olefin elastomer, a silicon resin, or an alloy or blend of any of these resins and/or an elastomer and a rubber.

The expression of the stabilization effect of the synthetic resin is variable depending on, for example, the stereoregularity, the specific gravity, the type of polymerization catalyst, the presence/absence and extent of removal of the polymerization catalyst, the degree of crystallization, the polymerization conditions such as temperature and pressure, the crystal type, the size of lamella crystal determined by X-ray small-angle scattering, the aspect ratio of the crystal, the solubility in an aromatic or aliphatic solvent, the solution viscosity, the melt viscosity, the average molecular weight, the degree of molecular weight distribution, the number of peaks in the molecular weight distribution, whether the copolymer thereof is a block or random copolymer, and the blending ratio of each monomer; however, any synthetic resin can be selected and applied.

In the synthetic resin composition of the present invention, the synthetic resin is preferably a polyolefin-based resin, for example, an α-olefin homopolymer or copolymer such as polypropylene, low-density polyethylene, linear low-density polyethylene, high-density polyethylene, polybutene-1, poly-3-methylpentene, poly-4-methylpentene or an ethylene-propylene copolymer; or a halogen-containing resin such as polyvinyl chloride, polyvinylidene chloride, chlorinated polyethylene, chlorinated polypropylene, polyvinylidene fluoride, chlorinated rubber, a vinyl chloride-vinyl acetate copolymer, a vinyl chloride-ethylene copolymer, a vinyl chloride-vinylidene chloride copolymer, a vinyl chloride-vinylidene chloride-vinyl acetate ternary copolymer, a vinyl chloride-acrylate copolymer, a vinyl chloride-maleate copolymer or a vinyl chloride-cyclohexylmaleimide copolymer, because the effects of the present invention can be attained prominently.

The method of incorporating the thermal stabilizer composition of the present invention into the synthetic resin is not particularly restricted, and a known technique for incorporating a resin additive can be employed. For example, any of a method of adding the thermal stabilizer composition to the polymerization system in advance before polymerization of the synthetic resin, a method of adding the thermal stabilizer composition during the polymerization and a method of adding the thermal stabilizer composition after the polymerization can be employed. Further, in cases where the thermal stabilizer composition is added after the polymerization of the synthetic resin, for example, a method in which the thermal stabilizer composition is mixed with powder or pellet of the synthetic resin to be stabilized using a Henschel mixer or the like and the resulting mixture is then kneaded using a processing machine such as an extruder, or a method in which the thermal stabilizer composition of the present invention is masterbatched and then added to the synthetic resin can be employed. The type of the processing machine to be used, the processing temperature, the post-processing cooling conditions and the like are also not particularly restricted, and the blending conditions can be selected as appropriate such that the resulting resin has physical properties that are suitable for the intended use. Moreover, the thermal stabilizer composition of the present invention can be added to the synthetic resin individually or in the form of granules impregnated with other resin additive(s), a filler or the like.

The thermal stabilizer composition of the present invention is used in an amount in a range of 0.001 to 10 parts by mass, preferably 0.01 to 3 parts by mass, more preferably 0.03 to 0.5 parts by mass, with respect to 100 parts by mass of the synthetic resin. When the amount is less than 0.001 parts by mass, the required stabilization effect may not be attained, whereas when the amount is greater than 10 parts by mass, the thermal stabilizer composition may bleed out of the resulting molded article to impair the outer appearance of the molded article. It is noted here, however, that the above-described amount represents the amount to be used in a molded article which is the final product; and that, for example, as in the case of a masterbatch, when the thermal stabilizer composition is diluted by being added to the synthetic resin and molded in a later step and the amount of the thermal stabilizer composition incorporated into the resulting molded article is within the numerical range of the present invention, the thermal stabilizer composition may be used in the masterbatch in an amount of greater than 10 parts by mass.

The use of the synthetic resin composition of the present invention is not particularly restricted, and the synthetic resin composition of the present invention can be used in automobile parts, building materials, agricultural materials, packaging materials, miscellaneous daily goods, consumer electronics materials, housing materials, fiber materials, toys and the like. Particularly, the synthetic resin composition of the present invention is useful in those applications that are sensitive to an odor, such as food packaging materials, beverage bottle containers and seasoning containers.

The synthetic resin composition of the present invention can be molded by a known molding method, examples of which include known molding techniques such as extrusion molding, injection molding, hollow molding, blow molding, and film/sheet molding.

EXAMPLES

The thermal stabilizer composition of the present invention will now be described in more detail by way of examples and comparative examples thereof; however, the present invention is not restricted thereto by any means.

Examples 1-1 to 1-10 and Comparative Examples 1-1 to 1-10

In accordance with the respective formulations shown in Tables 1 to 4, 10 g of each thermal stabilizer composition was prepared and placed in a 100-mL glass sample vial, which was subsequently tightly sealed and left to stand in a 50° C. oven. A sensory test for the odor of each thermal stabilizer composition was performed by 10 panelists.

In Comparative Example 1-1, the evaluation was performed without adding any material other than triisodecyl phosphite.

In Comparative Example 1-2, the evaluation was performed without adding any material other than triisodecyl phosphate.

In Comparative Example 1-10, 2% by mass of KYO-WAAD 300 (trade name) manufactured by Kyowa Chemical Industry Co., Ltd. was added as an adsorbent to triisodecyl phosphite, and the resultant was stirred for 5 minutes using a stirrer and then filtrated through a filter paper. The evaluation was performed using triisodecyl phosphite separated from the adsorbent.

(Odor)

Each thermal stabilizer composition was left to stand in a 50° C. oven immediately after the preparation, and the odor was evaluated at each time point of 14 days and 30 days thereafter in accordance with the following evaluation criteria by a method of slightly opening the lid of the sample vial and smelling the odor at the vial mouth. The results thereof are shown in Tables 1 to 4.

5: An unpleasantly strong odor was felt.
4: A strong odor was felt.
3: An odor was felt.
2: A slight odor was felt.
1: Hardly any odor was felt.

(Turbidity)

When each thermal stabilizer composition was prepared, the presence or absence of turbidity was evaluated visually. The results thereof are shown in Tables 1 to 4.

TABLE 1

| | | Example 1-1 | Example 1-2 | Example 1-3 | Example 1-4 | Example 1-5 |
|---|---|---|---|---|---|---|
| Triisodecyl phosphite | | 100 | 100 | 100 | 100 | 100 |
| Phenolic antioxidant 1 | | 0.01 | 0.1 | 1 | — | — |
| Phenolic antioxidant 2 | | — | — | — | 0.01 | 0.1 |
| Phenolic antioxidant 3 | | — | — | — | — | — |
| Sensory test (odor) | Immediately after production | 1 | 1 | 1 | 1 | 1 |
| | After 14 days | 1 | 1 | 1 | 1 | 1 |
| | After 30 days | 2 | 1 | 1 | 2 | 1 |
| Turbidity | | absent | absent | absent | absent | absent |

TABLE 2

|  | Example 1-6 | Example 1-7 | Example 1-8 | Example 1-9 | Example 1-10 |
|---|---|---|---|---|---|
| Triisodecyl phosphite | 100 | 100 | 100 | 100 | 100 |
| Phenolic antioxidant 1 | — | — | — | — | — |
| Phenolic antioxidant 2 | 5 | — | — | — | — |
| Phenolic antioxidant 3 | — | 0.01 | 0.1 | 5 | 10 |
| Sensory test (odor) Immediately after production | 1 | 1 | 1 | 1 | 1 |
| After 14 days | 1 | 1 | 1 | 1 | 1 |
| After 30 days | 1 | 2 | 1 | 1 | 1 |
| Turbidity | absent | absent | absent | absent | absent |

Phenolic antioxidant 1: 1,1,3-tris(2-methyl-5-tert-butyl-4-hydroxyphenyl)butane
Phenolic antioxidant 2: 4,4'-butylidene-bis(3-methyl-6-tert-butylphenol)
Phenolic antioxidant 3: n-octadecyl-3-(3',5'-di-tert-butyl-4-hydroxyphenyl)propionate

TABLE 3

|  | Comparative Example 1-1 | Comparative Example 1-2 | Comparative Example 1-3 | Comparative Example 1-4 | Comparative Example 1-5 |
|---|---|---|---|---|---|
| Triisodecyl phosphite | 100 | — | — | — | — |
| Triisodecyl phosphate | — | 100 | 100 | 100 | 100 |
| Phenolic antioxidant 1 | — | — | — | — | — |
| Phenolic antioxidant 2 | — | — | 0.01 | 0.1 | 1 |
| Phenolic antioxidant 3 | — | — | — | — | — |
| HALS-1 | — | — | — | — | — |
| Thioether-1 | — | — | — | — | — |
| Amine-1 | — | — | — | — | — |
| Adsorbent-1 | — | — | — | — | — |
| Sensory test (odor) Immediately after production | 2 | 2 | 1 | 1 | 1 |
| After 14 days | 3 | 3 | 2 | 1 | 1 |
| After 30 days | 5 | 5 | 3 | 3 | 1 |
| Turbidity | absent | absent | absent | absent | present |

HALS-1: 4-hydroxy-2,2,6,6-tetramethylpiperidyl-1-oxyl
Thioether-1: 4,6-bis(octylthiomethyl)-o-cresol
Amine-1: tri-2-propanolamine
Adsorbent-1: KYOWAAD 300 (trade name) manufactured by Kyowa Chemical Industry Co., Ltd.

TABLE 4

|  | Comparative Example 1-6 | Comparative Example 1-7 | Comparative Example 1-8 | Comparative Example 1-9 | Comparative Example 1-10 |
|---|---|---|---|---|---|
| Triisodecyl phosphite | 100 | 100 | 100 | 100 | 100 |
| Triisodecyl phosphate | — | — | — | — | — |
| Phenolic antioxidant 1 | — | — | — | — | — |
| Phenolic antioxidant 2 | — | — | — | — | — |
| Phenolic antioxidant 3 | 20 | — | — | — | — |
| HALS-1 | — | 0.5 | — | — | — |
| Thioether-1 | — | — | 0.5 | — | — |
| Amine-1 | — | — | — | 0.5 | — |
| Adsorbent-1 | — | — | — | — | 2.0 |
| Sensory test (odor) Immediately after production | 1 | 2 | 2 | 2 | 2 |
| After 14 days | 1 | 3 | 3 | 3 | 3 |
| After 30 days | 1 | 5 | 5 | 5 | 5 |
| Turbidity | present | absent | absent | absent | absent |

From Comparative Examples 1-1 and 1-2, it was confirmed that the odor was increased with time when a phosphite or a phosphate was incorporated without addition of a phenolic antioxidant. According to Comparative Examples 1-3 and 1-4, in the thermal stabilizer compositions containing a phenolic antioxidant in an amount of 0.1 parts by mass or less with respect to 100 parts by mass of a phosphate, the odor was suppressed immediately after the production; however, placement of these thermal stabilizer compositions under a heated environment resulted in an increased odor. From Comparative Example 1-5, it was found that, with 1 part by mass of a phenolic antioxidant being added to a phosphate, although the odor was suppressed even when the thermal stabilizer composition was placed under a heated environment, the phenolic antioxidant remained undissolved in the phosphate and caused turbidity.

According to Comparative Example 1-6, when 20 parts by mass of a phenolic antioxidant was added to a phosphite, the phenolic antioxidant remained undissolved. In Comparative Examples 1-7 to 1-9, no odor-improving effect was attained by an addition of a non-phenolic antioxidant or light stabilizer. Further, in Comparative Example 1-10, a treatment with an adsorbent did not result in an odor improvement.

In contrast, from Examples 1-1 to 1-10, it was confirmed that the odor is suppressed and worsening of the odor in a heated environment can be inhibited by adding a phenolic antioxidant to 100 parts by mass of a phosphorus-based antioxidant having a phosphite structure. Further, from Example 1-10, it was confirmed that no turbidity was observed in the thermal stabilizer composition in which 10 parts by mass of a phenolic antioxidant was incorporated with respect to 100 parts by mass of a phosphorus-based antioxidant having a phosphite structure and that the use of the thermal stabilizer composition thus presents no problem.

Examples 2-1 to 2-2 and Comparative Examples 2-1 to 2-5

Next, the thermal stabilization effect attained by adding the thermal stabilizer composition of the present invention to a synthetic resin was evaluated by the following procedure.

To 100 parts by mass of a low-density polyethylene having a melt flow rate (MFR) of 5 g/10 min at 190° C. and 2.16 kg load, 0.05 parts by mass of each thermal stabilizer composition as shown in Table 5, 0.05 parts by mass of calcium carbonate and 0.05 parts by mass of n-octadecyl-3-(3',5'-di-tert-butyl-4-hydroxyphenyl)propionate were added, and the resultant was mixed for 30 minutes using a rocking mixer. Then, using a uniaxial extruder (trade name: OEX3024, manufactured by DDM Co., Ltd.), the resulting mixture was granulated at a melting temperature of 230° C. and a screw speed of 30 rpm to produce a pellet. The thus obtained pellet was granulated repeatedly to evaluate the thermal stabilization effect. The evaluation was performed using each thermal stabilizer composition which had been left to stand for 30 days in a sample vial placed in a 50° C. oven. It is noted here however that, in Comparative Example 2-1, the evaluation was performed by granulating the pellet in the same manner as in Example 2-1 except that no thermal stabilizer composition was added.
(MFR)

Each granulated pellet was recovered and its melt flow rate (MFR: g/10 min) was measured in accordance with JIS K 7210 (temperature: 190° C., Load: 2.16 kg).

(Odor During Processing)

The odor during granulation was evaluated based on the following evaluation criteria. The results thereof are shown in Table 5.

5: An unpleasantly strong odor was felt.
4: A strong odor was felt.
3: An odor was felt.
2: A slight odor was felt.
1: Hardly any odor was felt.

TABLE 5

|  | Example 2-1 | Example 2-2 | Comparative Example 2-1 | Comparative Example 2-2 | Comparative Example 2-3 | Comparative Example 2-4 | Comparative Example 2-5 |
|---|---|---|---|---|---|---|---|
| Triisodecyl phosphite | 100 | 100 | — | 100 | — | — | — |
| Triisodecyl phosphate | — | — | — | — | 100 | 100 | 100 |
| Phenolic antioxidant 1 | 0.1 | — | — | — | — | — | 1 |
| Phenolic antioxidant 2 | — | 0.1 | — | — | — | 0.1 | — |
| MFR (g/10 min): first time | 4.8 | 4.8 | 4.8 | 4.8 | 4.6 | 4.6 | 4.6 |
| MFR (g/10 min): third time | 4.8 | 4.8 | 4.6 | 4.7 | 4.4 | 4.1 | 4.2 |
| MFR (g/10 min): fifth time | 4.7 | 4.7 | 4.6 | 4.6 | 4.0 | 4.1 | 4.2 |
| Odor during processing | 1 | 1 | 1 | 3 | 3 | 2 | 1 |

According to Comparative Examples 2-2 and 2-3, an odor was generated during processing when a phosphite or a phosphate was added with no phenolic antioxidant. According to Comparative Examples 2-4 and 2-5, although the odor was improved by adding a phenolic antioxidant to a phosphate, the repeated granulation resulted in a reduction in the MFR of the resin. It is believed that the MFR was reduced because the thermal stabilization effect provided by the phosphate was insufficient and this led to the occurrence of cross-linking reaction in the resin and/or the generation of gel. The generation of gel can potentially cause fish-eye generation in molded articles, particularly in films and sheets, impairing their outer appearance.

In contrast, from Examples 2-1 and 2-2, it was confirmed that, in these resin compositions comprising the thermal stabilizer composition of the present invention, the generation of odor during processing can be inhibited and the resin MFR can be maintained. It was thus verified that, in synthetic resin compositions comprising the thermal stabilizer composition of the present invention, an odor during processing is suppressed and the resin has excellent heat resistance.

Examples 3-1 to 3-7 and Comparative Examples 3-1 to 3-5

To 100 parts by mass of a vinyl chloride resin having a polymerization degree of 1,050, 50 parts by mass of diisononyl phthalate, 3 parts by mass of an epoxidized soybean oil (trade name: ADK STAB O-130P, manufactured by ADEKA Corporation), 0.5 parts by mass of a barium/zinc-based stabilizer (trade name: AP-551, manufactured by ADEKA Corporation) and 1 part by mass of the thermal stabilizer composition prepared in advance as shown in Table 6 or 7 were blended, and the resultant was rollprocessed at a processing temperature of 170° C. and a roll speed of 30 rpm for a roll-kneading time of 5 minutes to obtain a 0.7 mm-thick sheet.

The evaluation was performed using the respective thermal stabilizer compositions shown in Tables 6 and 7 which had been left to stand for 30 days in a sample vial placed in a 50° C. oven. It is noted here however that, in Comparative Example 3-1, the roll-processing was performed in the same manner as in Example 3-1 except that no thermal stabilizer composition was added; and that, in Comparative Example 3-5, a 0.7 mm-thick sheet was obtained by performing the roll-processing in the same manner as in Example 3-1 except that, without preparing a thermal stabilizer composition by adding a phenolic antioxidant to a phosphite, the phosphite and the phenolic antioxidant were separately added to the vinyl chloride resin such that the same formulation as that of the thermal stabilizer composition of Example 3-2 was attained.

(Preparation of Test Piece)

The thus obtained sheet was laminated, heated to 180° C. and then pressed to prepare a 2 mm-thick sheet as a test piece. The thus obtained test piece was left to stand for 1 day under a room temperature, and the coloration (Y.I.) was evaluated using a spectrocolorimeter (SC-T, manufactured by Suga Test Instruments Co., Ltd.). In addition, the presence or absence of odor during the roll-processing and the odor of the test piece after heating were also evaluated by the below-described methods. The results thereof are shown in Tables 6 and 7 below.

(Odor of Test Piece after Heating)

Each test piece was cut into 1-cm squares and 10 g thereof was placed in a sample vial, which was subsequently tightly sealed and left to stand in a 50° C. oven for 24 hours. Thereafter, the sample vial was taken out and the lid thereof was slightly opened to evaluate the odor at the vial mouth based on the following criteria.

5: An unpleasantly strong odor was felt.

4: A strong odor was felt.

3: An odor was felt.

2: A slight odor was felt.

1: Hardly any odor was felt.

TABLE 6

|  | Example 3-1 | Example 3-2 | Example 3-3 | Example 3-4 | Example 3-5 | Example 3-6 |
|---|---|---|---|---|---|---|
| Triisodecyl phosphite | 100 | 100 | 100 | 100 | 100 | 100 |
| Triisodecyl phosphate | — | — | — | — | — | — |
| Phenolic antioxidant 1 | 0.01 | 0.1 | — | — | — | — |
| Phenolic antioxidant 2 | — | — | 0.01 | 0.1 | — | — |
| Phenolic antioxidant 3 | — | — | — | — | 0.001 | 0.01 |
| Odor during processing | 2 | 1 | 2 | 1 | 3 | 2 |
| Coloration (Y.I.) | 35 | 36 | 37 | 37 | 36 | 37 |
| Odor of molded article after heating | 2 | 1 | 2 | 1 | 3 | 2 |

TABLE 7

|  | Example 3-7 | Comparative Example 3-1 | Comparative Example 3-2 | Comparative Example 3-3 | Comparative Example 3-4 | Comparative Example 3-5 |
|---|---|---|---|---|---|---|
| Triisodecyl phosphite | 100 | — | 100 | — | — | 100 |
| Triisodecyl phosphate | — | — | — | 100 | 100 | — |
| Phenolic antioxidant 1 | — | — | — | — | 0.1 | 0.1 |
| Phenolic antioxidant 2 | — | — | — | — | — | — |
| Phenolic antioxidant 3 | 0.1 | — | — | — | — | — |
| Odor during processing | 1 | 1 | 5 | 5 | 3 | 5 |
| Coloration (Y.I.) | 37 | 45 | 35 | 45 | 47 | 36 |
| Odor of molded article after heating | 1 | 1 | 5 | 5 | 3 | 5 |

According to Comparative Examples 3-3 and 3-4, when a phenolic antioxidant was added to a phosphate, although the odor of the molded articles was suppressed both during processing and under a heated environment, the coloration of the molded articles could not be improved. Further, from Comparative Example 3-5, it was found that, even with the same formulation as that of a synthetic resin composition whose odor was improved by incorporation of a thermal stabilizer composition prepared by adding a phenolic antioxidant to a phosphite, the odor was not improved when the phosphite and the phenolic antioxidant were added separately to the synthetic resin.

In contrast, from Examples 3-1 to 3-7, it was confirmed that, in the molded article of the synthetic resin composition of the present invention, the generation of odor can be inhibited during processing as well as when the molded article is placed under a heated environment and coloration of the molded article can be more inhibited than in Comparative Example 3-1 where no thermal stabilizer composition was added.

In view of the above, the present invention provides a thermal stabilizer composition in which a phosphite odor is suppressed, and the synthetic resin composition of the present invention which comprises the thermal stabilizer composition has excellent thermal stabilization effect in that generation of phosphite odor in the molded article thereof is inhibited during processing and under a heated environment and coloration of the molded article can also be suppressed. The thermal stabilizer composition of the present invention and the synthetic resin composition of the present invention comprising the same are particularly useful in those applications where a phosphite odor should be avoided.

The invention claimed is:

1. A thermal stabilizer composition, consisting of comprising:
   100 parts by mass of a phosphorus-based antioxidant having a phosphite structure;
   0.01 to 5 parts by mass of a phenolic antioxidant; and
   optionally, one or more resin additives,
   wherein said phenolic antioxidant has a substructure represented by the following Formula (2″):

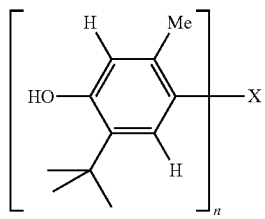

wherein, n represents an integer of 1 to 4;
   when n is 1, X represents an alkyl group having 1 to 40 carbon atoms, an alkoxy group having 1 to 40 carbon atoms, an aryl group having 6 to 40 carbon atoms, an arylalkyl group having 7 to 40 carbon atoms or a combination thereof;
   when n is 2, X represents an alkylidene group having 1 to 40 carbon atoms, an arylene group having 6 to 40 carbon atoms or a group represented by the following Formula (3):

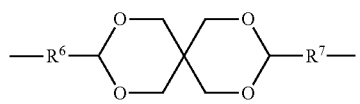

wherein, $R^6$ and $R^7$ each independently represent an alkylidene group having 1 to 40 carbon atoms or an arylene group having 6 to 40 carbon atoms;
   when n is 3, X represents an alkanetriyl group having 1 to 40 carbon atoms or a trivalent cyclic group having 6 to 40 carbon atoms,
   when n is 4, X represents an alkanetetrayl group having 1 to 40 carbon atoms; and
   wherein a methylene group in said alkyl group, alkoxy group, arylalkyl group, alkylidene group, alkanetriyl group and alkanetetrayl group is optionally substituted with >C═O, —O—, —S—, —CO—O—, —O—CO—, —O—CO—O—, —NR$^5$—, a phosphine, a phosphinite, a phosphonite, a phosphite, a phosphorane, a phosphonate or a combination thereof and optionally branched, and $R^5$ represents a hydrogen atom or an alkyl group having 1 to 4 carbon atoms,
   wherein, in formula 2″, X forms a carbon-carbon bond with the phenyl group, and
   wherein said phenolic antioxidant has a molecular weight in a range of 300 to 2,000,
   wherein said phosphorus-based antioxidant is represented by Formula (4):

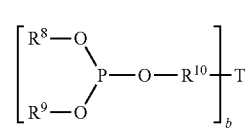

wherein, $R^8$ and $R^9$ each independently represent an alkyl group having 1 to 40 carbon atoms, $R^{10}$ represents a direct bond, b is 1, and T represents an alkyl group having 1 to 40 carbon atoms; and
   wherein the one or more resin additives are selected from the group consisting of thioether-based antioxidant, an ultraviolet absorber, a hindered amine-based light stabilizer, a nucleating agent, a flame retardant, a flame retardant aid, a lubricant, a filler, a metallic soap, a hydrotalcite, an antistatic agent, a pigment, a dye, and a combination thereof.

2. The thermal stabilizer composition according to claim 1, wherein said phosphorus-based antioxidant having a phosphite structure has a melting point of 100° C. or lower.

3. A synthetic resin composition comprising 0.001 to 10 parts by mass of the thermal stabilizer composition according to claim 1 with respect to 100 parts by mass of a synthetic resin.

4. The thermal stabilizer composition according to claim 1, wherein n in Formula (2″) is an integer of 2 or 3.

5. The thermal stabilizer composition according to claim 1, wherein said phenolic antioxidant comprises 1,1,3-tris(2-methyl-5-tert-butyl-4-hydroxyphenyl)butane.

6. The thermal stabilizer composition according to claim 1, wherein said phenolic antioxidant comprises 4,4′-butylidene-bis(3-methyl-6-tert-butylphenol).

* * * * *